United States Patent [19]
Iwaki et al.

[11] Patent Number: 5,600,485
[45] Date of Patent: Feb. 4, 1997

[54] OPTICAL PATTERN RECOGNITION SYSTEM METHOD OF FERROELECTRIC LIQUID CRYSTAL SPATIAL LIGHT MODULATOR

[75] Inventors: Tadao Iwaki; Yasuyuki Mitsuoka, both of Tokyo, Japan

[73] Assignees: Seiko Instruments Inc.; Sumitomo Cement Co. Ltd., Japan

[21] Appl. No.: 282,076

[22] Filed: Jul. 28, 1994

Related U.S. Application Data

[62] Division of Ser. No. 870,133, Apr. 15, 1992, abandoned.

[30] Foreign Application Priority Data

Apr. 23, 1991 [JP] Japan .................................. 3-092461
Jul. 22, 1991 [JP] Japan .................................. 3-181316

[51] Int. Cl.$^6$ ............................ G02B 27/46; G06F 17/15; G06K 9/64
[52] U.S. Cl. ........................................... 359/561; 382/211
[58] Field of Search ............................. 359/29, 561, 72; 382/42, 210, 211

[56] References Cited

U.S. PATENT DOCUMENTS

| | | | |
|---|---|---|---|
| 4,695,973 | 9/1987 | Yu | 364/822 |
| 4,832,447 | 5/1989 | Javidi | 359/561 |
| 4,941,735 | 7/1990 | Moddle et al. | 359/72 |
| 5,040,140 | 8/1991 | Horner | 364/822 |
| 5,071,231 | 12/1991 | Armitage | 359/72 |
| 5,119,443 | 6/1992 | Javidi et al. | 382/42 |

OTHER PUBLICATIONS

Pro. of the SPIE: Computer and Optically Formed Holographics Optics, vol. 1211, 15 Jan. 1990, Los Angeles, CA, pp. 273–283, S. Yamamoto et al., "Optical Pattern Recognition With LAPS–SLM I/Light Addressed Photoconductor and Smectic C* LC Spatial Light Modulator".

Pro. of SPIE. Advances in Optical Processing III, vol. 936, 6 Apr. 1988, Orlando, FL, pp. 48–55, G. Moddel et al., "Design and Performance of High–speed Optically–Addressed Spatial Light Modulators".

Optics Letters, vol. 15, No. 21, 1 Nov. 1990, pp. 1218–1220, T. Iwaki et al., "Optical pattern recognition of letters by a joint–transform correlator using ferroelectric LC spatial light modulator".

*Primary Examiner*—Paul M. Dzierzynski
*Assistant Examiner*—Audrey Chang
*Attorney, Agent, or Firm*—Adams & Wilks

[57] ABSTRACT

An high-speed, high-resolution optical pattern recognition system which automatically recognizes or measures a specified pattern from two-dimensional images comprises an image display device for displaying at least one reference image including at least one target and at least one input image, a device including a laser diode having an oscillation wavelength less than 900 nm for converting the at least one reference image and the at least one input image into a coherent image, a Fourier transform lens for optically Fourier transforming the coherent image to produce a joint Fourier-transformed image, an optically addressed ferroelectric liquid crystal spatial light modulator having no light reflection layer, a device for converting the joint Fourier-transformed image into an intensity distribution image and displaying the intensity distribution image on the optically addressed spatial light modulator, and a device including a laser diode having an oscillation wavelength longer than 660 nm for reading the intensity distribution image displayed on the optically addressed spatial light modulator. The Fourier transform lens also Fourier transforms the intensity distribution image to produce a two-dimensional correlation image distribution of the reference image and the input image and a detector detects the correlation peak intensity of the reference image and the input image contained in the correlation image distribution and outputs a corresponding electrical signal.

12 Claims, 14 Drawing Sheets

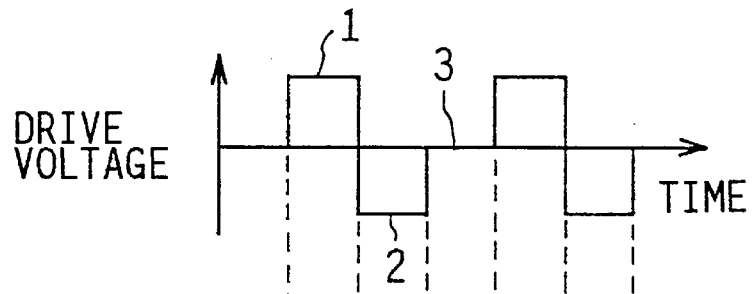
FIG.1(a) DRIVE VOLTAGE
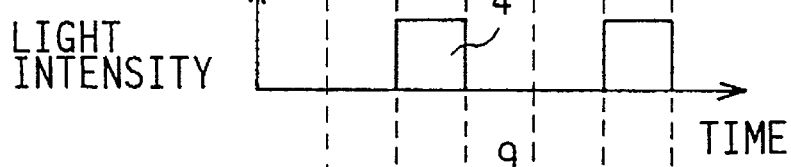
FIG.1(b) LIGHT INTENSITY
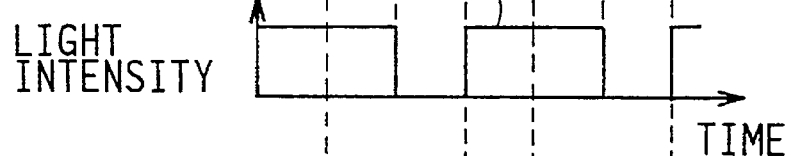
FIG.1(c) LIGHT INTENSITY
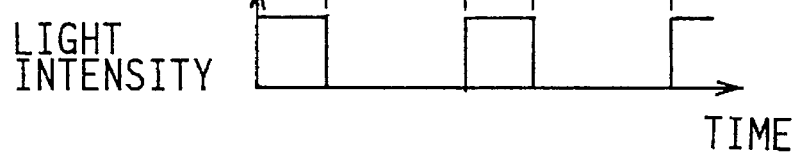
FIG.1(d) LIGHT INTENSITY

FIG.3 PRIOR ART
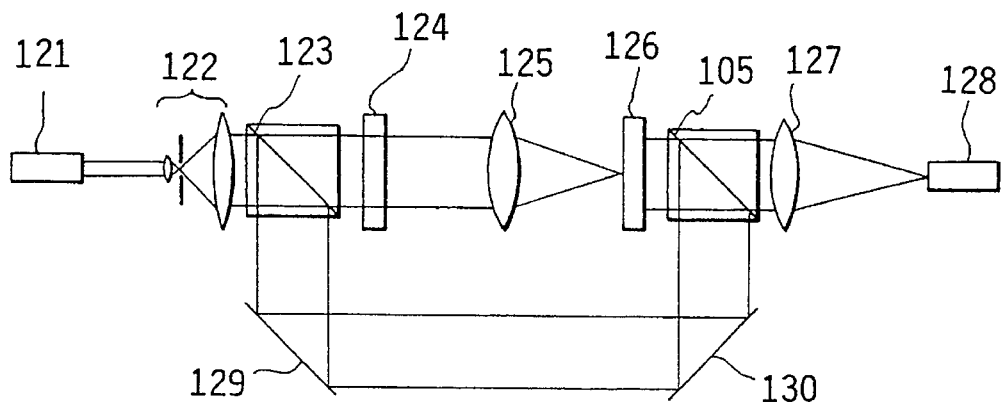
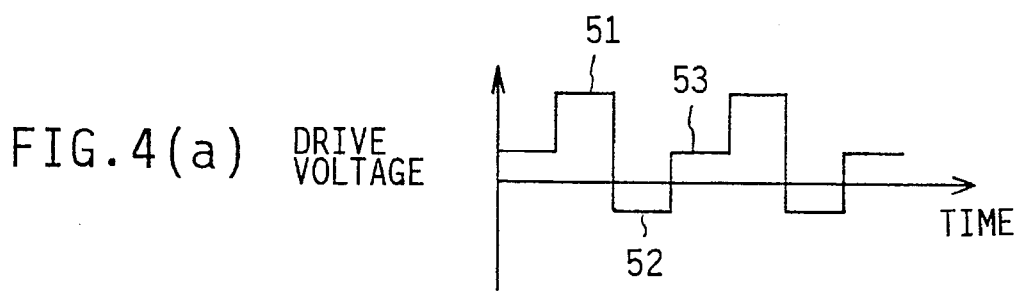
FIG.4(a) DRIVE VOLTAGE
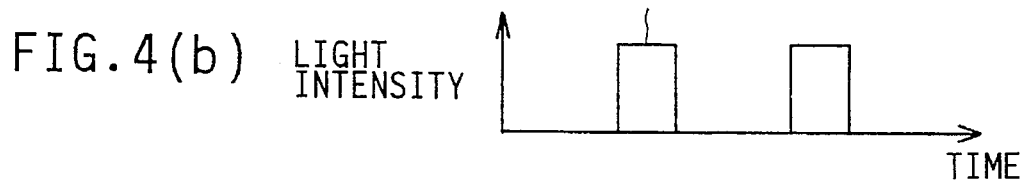
FIG.4(b) LIGHT INTENSITY
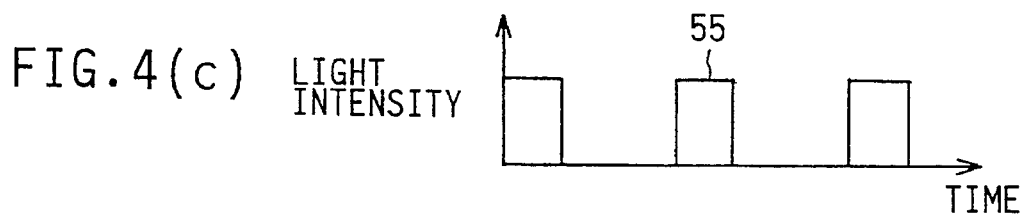
FIG.4(c) LIGHT INTENSITY
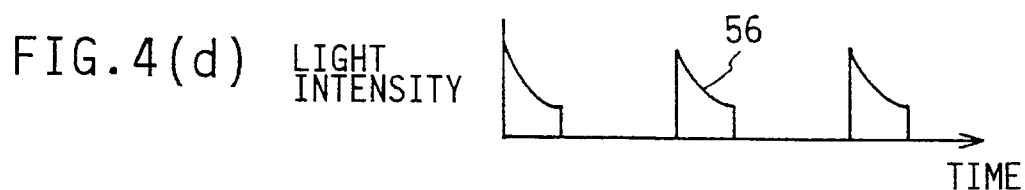
FIG.4(d) LIGHT INTENSITY FIG.7(a) DRIVE VOLTAGE 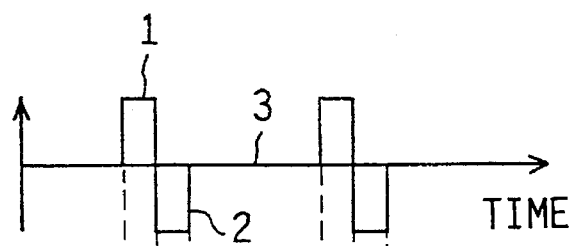
FIG.7(b) LIGHT INTENSITY 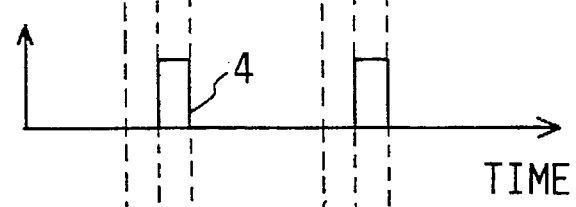
FIG.7(c) DRIVE VOLTAGE 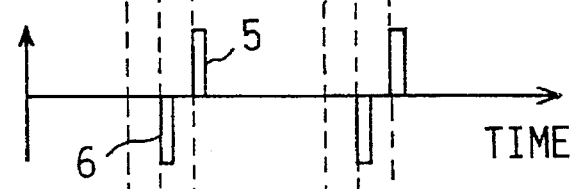
FIG.7(d) LIGHT INTENSITY 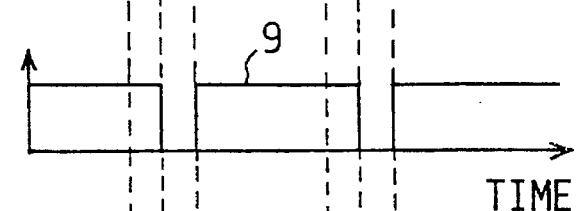
FIG.7(e) DRIVE VOLTAGE 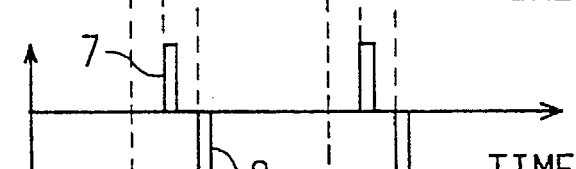
FIG.7(f) LIGHT INTENSITY 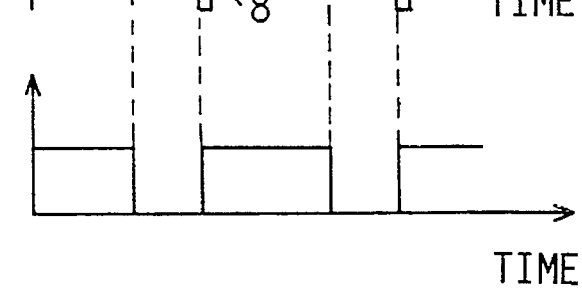

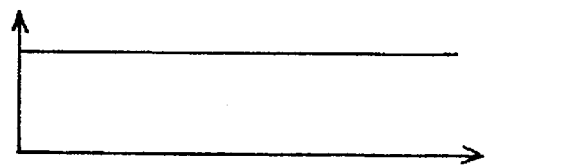
FIG.9(a) LIGHT INTENSITY
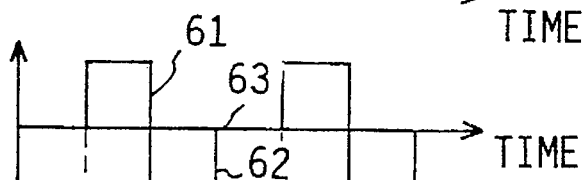
FIG.9(b) DRIVE VOLTAGE
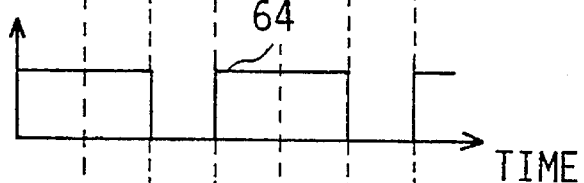
FIG.9(c) LIGHT INTENSITY
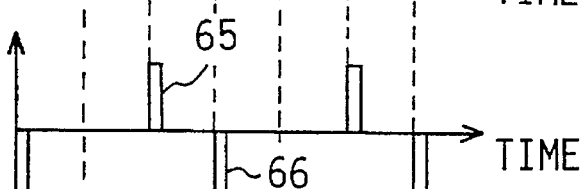
FIG.9(d) DRIVE VOLTAGE
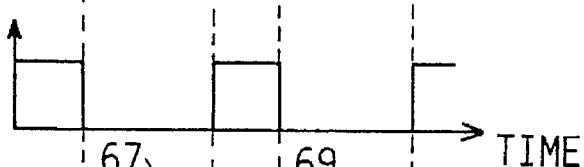
FIG.9(e) LIGHT INTENSITY
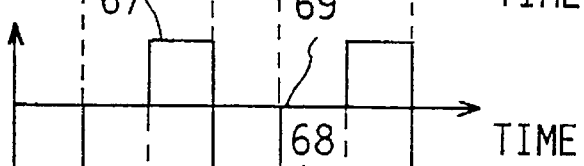
FIG.9(f) DRIVE VOLTAGE
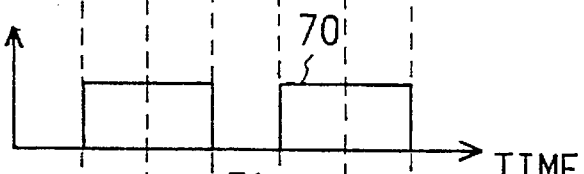
FIG.9(g) LIGHT INTENSITY
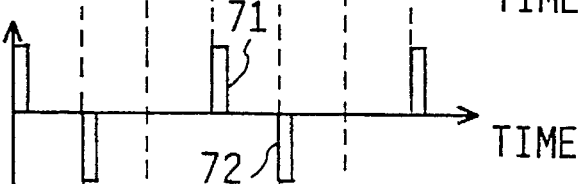
FIG.9(h) DRIVE VOLTAGE
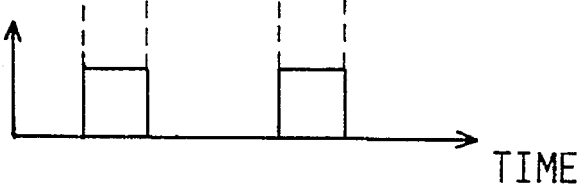
FIG.9(i) LIGHT INTENSITY

INPUT IMAGE  REFERENCE IMAGE

CORRELATION IMAGE

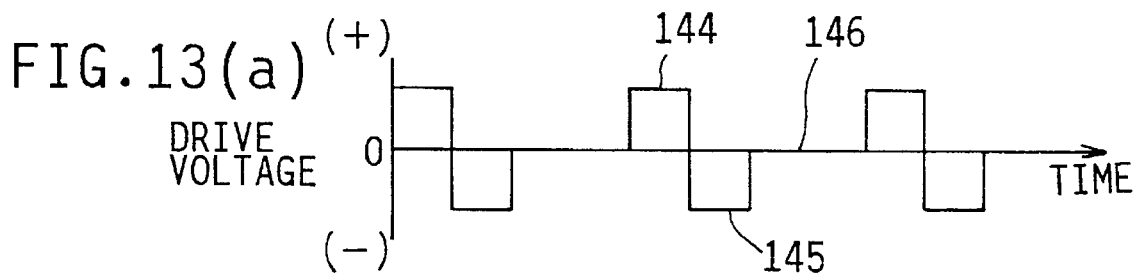
FIG.13(a) DRIVE VOLTAGE
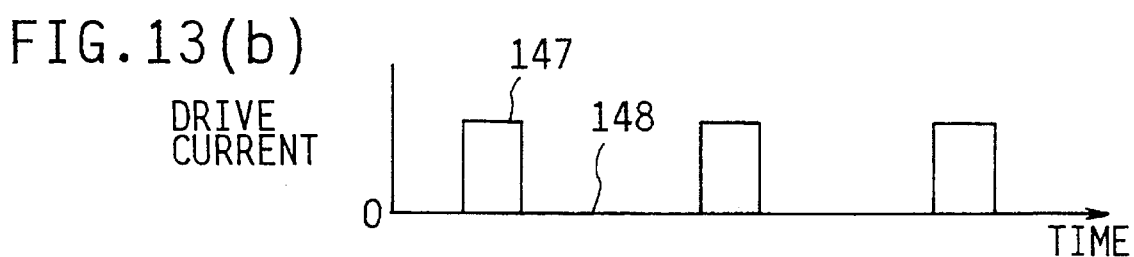
FIG.13(b) DRIVE CURRENT
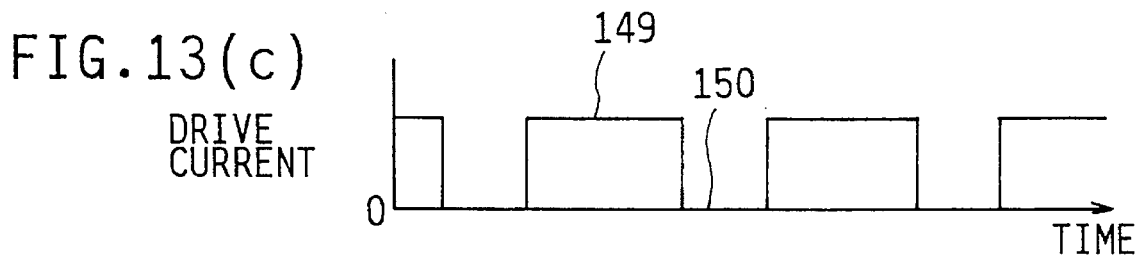
FIG.13(c) DRIVE CURRENT
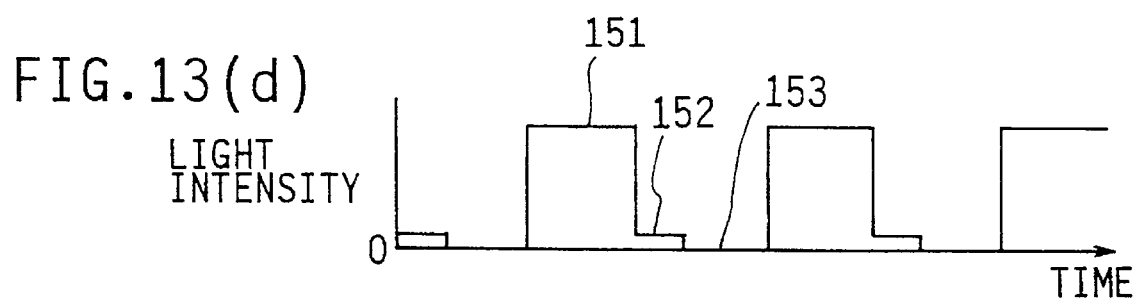
FIG.13(d) LIGHT INTENSITY

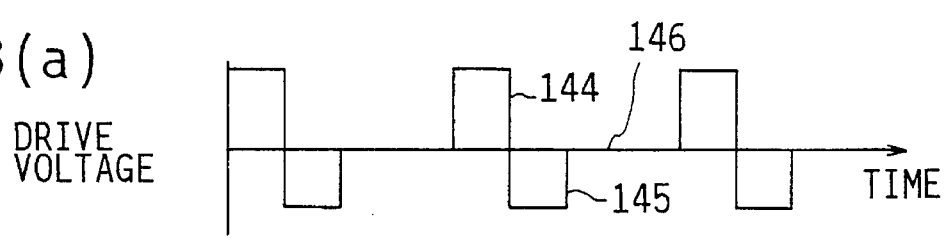
FIG.18(a) DRIVE VOLTAGE
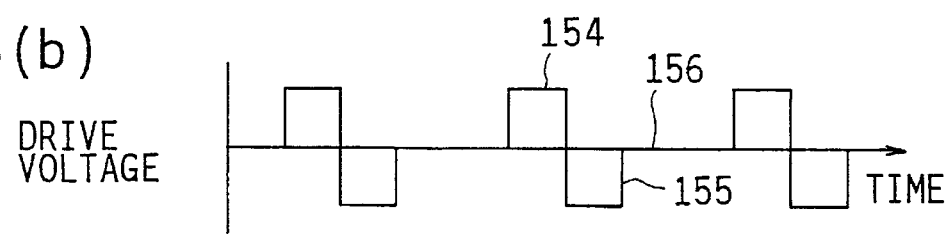
FIG.18(b) DRIVE VOLTAGE
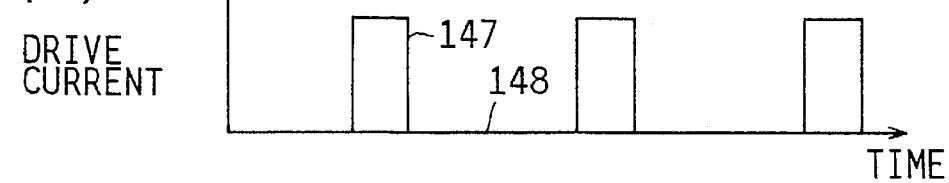
FIG.18(c) DRIVE CURRENT
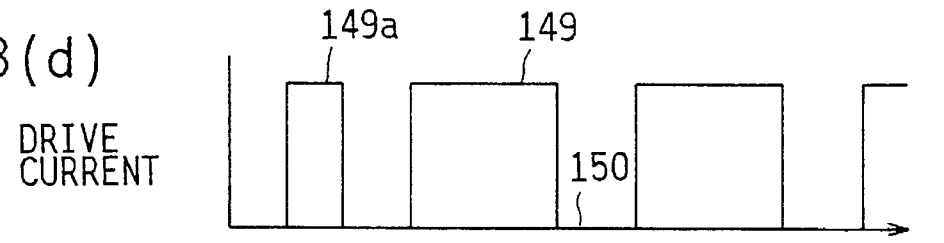
FIG.18(d) DRIVE CURRENT
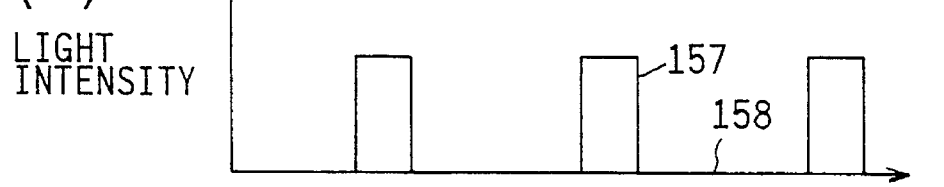
FIG.18(e) LIGHT INTENSITY
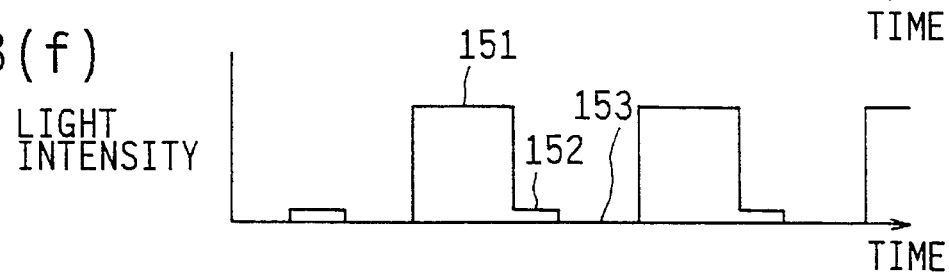
FIG.18(f) LIGHT INTENSITY

OPTICAL PATTERN RECOGNITION SYSTEM METHOD OF FERROELECTRIC LIQUID CRYSTAL SPATIAL LIGHT MODULATOR

This is a division of application Ser. No. 07/870,133, filed Apr. 15, 1992, now abandoned.

BACKGROUND OF THE INVENTION

In a field of optical information processing and optical measurement, the present invention relates to a system which uses coherent light beams to perform optical correlation processing on two-dimensional images obtained either from photographing devices such as CCD cameras, or directly from objects, and thereby automatically perform pattern recognition and measurement. The invention also relates to a method of driving a ferroelectric liquid crystal spatial light modulator used in this system.

Among conventional optical pattern recognition systems and correlation processing apparatuses, a joint transform correlator is well known. Patents concerning this method include Japan Patent Laid-Open Nos. 138616/1982, 210316/1982 and 21716/2983. One example of a conventional correlator of this method is shown in FIG. 3. In this method, a reference image that provides a reference for recognition and an input image to be recognized are arranged simultaneously side by side to form an object image 124. A light beam emitted from a laser 121 is expanded by a beam expander 122 and then split into two beams by a beam splitter 123. The beam, having passed through the beam splitter 123, irradiates the object image 124 to transform it into a coherent image. The coherent image is Fourier-transformed by a first Fourier transform lens 125 to display a light intensity distribution of a joint Fourier-transformed image of the reference image and the input image on an optically addressed type light valve 126 placed on the transformation plane. The joint Fourier-transformed image is an interference fringe pattern produced by interference between two (or multiple) Fourier-transformed beams of the input image and the reference image and includes conjugate components of these images.

Next, the beam split by the beam splitter 123 is reflected by mirrors 129, 130 and a polarized beam splitter 105 to irradiate the optically addressed type light valve 126, converting the light intensity distribution of the joint Fourier-transformed image displayed into a coherent image. The coherent image is read as a negative or positive image as it passes through the polarized beam splitter 105 that acts as a light detector, and then the image is received by the CCD camera 128 located on the image transformation plane. In this way, a correlation peak representing a two-dimensional correlation coefficient of the reference image and the input image is obtained from the CCD camera 128.

Such optical pattern recognition systems and correlation processing apparatuses have come to require a spatial light modulator having a high resolution and a high-speed response as the research of these devices progresses. The optically addressed type spatial light modulators that have been in common use include those using an electric-optical liquid crystal such as $Bi_{12}SiO_{20}$ crystal and a liquid crystal light valve using nematic liquid crystal. These, however, do not fully satisfy the requirements such as resolution and high-speed responsiveness. Under these situations, a new optically addressed type spatial light modulator (FLC-OASLM), which uses a ferroelectric crystal as a light modulating material, have been developed and come to be used.

As shown in FIG. 3, however, since the conventional joint transform optical correlators are required to use two Fourier transform lenses 125, 127 to produce a joint Fourier-transformed image of the reference image and the input image and to produce correlation peaks that correspond to two-dimensional correlation coefficients between the reference image and the input image, the system becomes very large. It may be possible to reduce the size of the system by using an optically addressed type spatial light modulator of a transmission type that uses $Si_{12}SiO_{20}$ crystal, instead of an optically addressed type liquid crystal light valve, to make one and the same Fourier transform lens work as two different Fourier transform lenses. The optically addressed type spatial light modulator using the $Si_{12}SiO_{20}$ crystal, however, has a drawback of being unable to directly modulate and operate the laser diode at high speed because of the modulator's low write sensitivity to the oscillation frequency of the laser diode, and because of its high drive voltage of several kV. The optically addressed type spatial light modulator with the $Si_{12}SiO_{20}$ crystal has a low resolution of 15–30 lp/mm, so that forming a small object image requires either putting the reference image and the input image very close together or using a Fourier transform lens with a very long focal length, making it practically impossible to reduce the size of the system.

Further, since the conventional optically addressed type spatial light modulator takes about 100 msec to record, read and erase a picture, it is difficult to operate at high speed an optical recognition system using the optically addressed type spatial light modulator.

The FLC-OASLM with no light reflection and separation layers has the following problems. Because it has no dielectric mirrors or light shielding layers, the writing light and the reading light cannot be separated and the reading light has adverse effects on a photoconductive layer. Even when the FLC-OASLM has light reflection and separation layers, if the reading light is too strong or the transmission factors of the dielectric mirror and the light shielding layer are not sufficiently small, the reading light will adversely affect the photoconductive layer. That is, when a strong reading light is radiated when the FLC-OASLM is being applied with writing pulses, the reading light acts on the photoconductive layer in the same way as the writing light to induce the inversion of the ferroelectric crystal molecules, resulting in a failure of an image being recorded to be written correctly or at all. To avoid this, the conventional practice is to use a very weak reading light of an intensity that will not adversely affect the photoconductive layer.

However, when a weak reading light is used, the light intensity of an image being actually read, though it depends on the wavelength of the reading light, is very small because the FLC-OASLM has no ferroelectric mirrors and the reflection factor of its reading light is low. As a result, at the next step where the image thus read out is optically processed and recorded again in another spatial light modulator, the light intensity of the image may become so weak as will make the next step processing difficult or impossible.

A further disadvantage is that the writing characteristic such as sensitivity and resolution of the FLC-OASLM varies greatly depending on the strength of the reading light.

SUMMARY OF THE INVENTION

An object of this invention is to provide a reduced-size optical pattern recognition system that has a reduced-size joint transform correlator.

Another object of the invention is to provide an optical pattern recognition system with an increased operation speed.

A further object of the invention is to provide a method of operating at high speed an optically addressed type spatial light modulator that uses a ferroelectric crystal.

The optical pattern recognition system of this invention automatically identifies and measures a specified pattern by performing an optical correlation processing, which uses coherent light, on a two-dimensional image directly obtained from an object or through a CCD camera. The optical pattern recognition system of this invention is a joint transform correlator which comprises: means for transforming into a coherent image at least one reference image including specified marks and at least one input image to be entered, both images being displayed on an image display means; means for performing an optical Fourier transform on the coherent image to produce a joint Fourier-transformed image of the reference image and the input image; means for converting the joint Fourier-transformed image into an intensity distribution image and displaying the intensity distribution image on an optically addressed type spatial light modulator; means for reading the intensity distribution image displayed on the optically addressed type spatial light modulator by using coherent light; means for Fourier-transforming the intensity distribution image thus read out to produce a two-dimensional correlation image distribution between the reference image and the input image; and a light-electricity conversion element for detecting a correlation peak intensity corresponding to the correlation coefficient between the reference image and the input image, both included in the correlation image distribution. In such a joint transform correlator, the means for transforming into a coherent image at least one reference image including specified marks and at least one input image to be entered, both images being displayed on an image display means, includes a laser diode whose oscillation wavelength is less than 900 nm. The means for reading the intensity distribution image displayed on the optically addressed type spatial light modulator by using coherent light includes a laser diode whose oscillation wavelength is more than 660 nm. The optically addressed type spatial light modulator is an FLC-OASLM without a light reflection layer whose photoconductive layer is formed of a hydrogenated amorphous silicon. The means for performing an optical Fourier transform on the coherent image to produce a joint Fourier-transformed image of the reference image and the input image and the means for Fourier-transforming the intensity distribution image read out from the optically addressed type spatial light modulator to produce a two-dimensional correlation image distribution between the reference image and the input image are formed by one and the same Fourier transform lens. This configuration solves the problem in the way to reducing the size of the joint transform light correlator.

The driving apparatus for the optical pattern recognition system of this invention has a drive means for driving the optically addressed type spatial light modulator, which uses a ferroelectric liquid crystal as the light modulating material. Either or both of writing light modulating means for modulating the writing light to write an image onto the spatial light modulator and reading light modulating means for modulating the reading light to read the image recorded on the spatial light modulator are also included in the driving apparatus. Means for synchronizing the drive means, the writing light modulating means and the reading light modulating means with each other is also included. The drive apparatus performs control so that the writing light irradiation time and the write voltage application time overlap for at least a specified period and that the reading light irradiation time does not overlap the write voltage application time. This drive method assures the high-speed operation and solves the problem of adverse effects the writing light has on the FLC-OASLM.

First, the construction of the FLC-OASLM used in this invention will be described. FIG. 6(a) shows one example construction of the FLC-OASLM that has no light reflection layer of this invention. Transparent substrates 133a, 133b such as glass and plastics that sandwich crystal molecules are provided at the surfaces with transparent electrodes 134a, 134b and alignment layers 135a, 135b, the alignment layers being oblique-evaporated with SiO in the range of 75 to 85 degrees from the direction normal to the transparent substrate. The transparent substrates 133a, 133b clamp a ferroelectric liquid crystal layer 136, with their alignment layer 135a, 135b sides facing each other to control a gap located therebetween in which spacers 139 are installed. Between the transparent electrode 134a and the alignment layer 135a on the optical writing side is formed a laminated photoconductive layer 137. The cell outer surfaces of the writing side transparent substrate 133a and the reading side transparent substrate 133b are formed with anti-reflection coatings 138a, 138b. FIG. 6(b) shows one example construction of the FLC-OASLM that has a light reflection layer used in this invention. What differs from the FLC-OASLM without the light reflection layer shown in FIG. 6(a) is that the FLC-OASLM with the light reflection layer has a light shielding layer 142 and a dielectric mirror 143 stacked together between the photoconductive layer 137 and the alignment layer 135a.

Next, the method of initializing the FLC-OASLM of the above construction is described. The first method involves irradiating with light the entire writing surface of the FLC-OASLM (in the case of the ferroelectric crystal light valve without a light reflection layer, the reading side may be irradiated), applying between the transparent electrodes 134a and 134b a pulse voltage or dc bias voltage sufficiently higher than a lighted-state operation threshold voltage or a dc bias voltage superimposed with 100 Hz–50 kHz ac voltage to align the ferroelectric crystal molecules in one direction in a stable condition, and then storing this condition in memory. The second method consists of applying between the transparent electrodes 134a and 134b a pulse voltage or dc bias voltage sufficiently higher than a dark-state operation threshold voltage or a dc bias voltage superimposed with 100 Hz–50 kHz ac voltage to align the ferroelectric liquid crystal in one direction in a stable condition, and then storing that condition in memory.

Now, the operation of FLC-OASLM after being initialized as mentioned above will be explained. A picture is written with a laser beam while the transparent electrodes 134a and 134b are impressed with a pulse voltage or dc bias voltage whose polarity is reverse to that when the initialization was performed and whose magnitude is lower than the dark-state operation threshold voltage and higher than the lighted-state operation threshold voltage. Or the image writing with a laser beam is performed while these transparent electrodes are applied with adc bias voltage superimposed with 100 Hz–50 kHz ac voltage. Let us consider a case where a hydrogenated amorphous silicon is used as the photoconductive layer 137. If the wavelength of the laser beam is shorter than about 900 nm, the area of the photoconductive layer struck by the laser beam produces carriers, which are drifted in the direction of electric field by the applied voltage, causing a drop in the drive threshold voltage. This in turn applies to the laser-irradiated area a bias voltage whose polarity is reverse to that of the voltage when the initialization was performed and whose magnitude is higher than the operation threshold voltage. The ferroelectric liquid crystal reverses its molecules into another stable state as a result of spontaneous polarizing, causing the image to be digitized and stored in memory. The stored image is kept intact even when the drive voltage becomes zero.

The digitized and stored image can be read out in positive or negative state by radiating a linearly polarized reading light whose polarizing axis is arranged in the direction of alignment of the initialized crystal molecules (or perpendicular to it) and by passing the reflected light from the dielectric mirror 143 through a light detector, whose polarizing axis is perpendicular (or parallel) to the polarizing direction of the reflected light.

When the hydrogenated amorphous silicon is used for the photoconductive layer 137, light whose wavelength is longer than about 660 nm passes through the photoconductive layer 137. Thus, if the laser beam with the wavelength longer than 660 nm is used as the reading light for the FLC-OASLM having no light reflection layer, then the FLC-OASLM can be used as the optically addressed type spatial light modulator of a transmission type. By holding the stored image with the drive voltage at zero, it is possible to read the stored image without erasing it.

The laser diode as a source of writing and reading light can be directly modulated at high speed, so that synchronizing the drive current with the drive voltage of the FLC-OASLM allows the optical pattern recognition system of the invention to be operated at high speed.

As to the method of driving at high speed the ferroelectric liquid crystal spatial light modulator that uses no laser diode, the voltage for driving the liquid crystal shutter which uses a ferroelectric liquid crystal as a light modulator is modulated to be synchronous with the drive voltage of the spatial light modulator, allowing the modulation of intensity of the writing and reading light. Thus, even when the spatial light modulator has no light reflection and separation layers and cannot separate the writing light and the reading light, or when it has light reflection and separation layers such as a dielectric mirror 143 but the reading light is not strong enough to affect the photoconductive layer 137, it is possible to shield, by these methods, the reading light for the time duration in which the writing voltage is applied to the spatial light modulator. As a result, the reading light is prevented from affecting the photoconductive layer of the spatial light modulator and deteriorating the writing characteristic. This in turn allows the use of strong reading light in reading the image at high speed.

BRIEF DESCRIPTION OF THE DRAWINGS

FIGS. 1(*a*) to 1(*d*) are diagrams showing the method of high-speed driving of the FLC-OASLM in digitally recording an image;

FIG. 3 is a diagram showing the configuration of one example of a conventional joint transform optical correlator;

FIGS. 4(*a*) to 4(*d*) are diagrams showing one example of high-speed driving of the FLC-OASLM when recording an image with tonal variations according to this invention;

FIGS. 7(*a*) to 7(*f*) are diagrams showing one embodiment of the high-speed driving method for FLC-OASLM according to this invention;

FIGS. 9(*a*) to 9(*i*) are diagrams showing one example method of performing a pattern recognition using the high-speed driving method for FLC-OASLM according to the invention;

FIGS. 13(*a*) to 13(*d*) are diagrams showing the driving signals for FLC-OASLM, writing LD and reading LD, and the optical response of the FLC-OASLM, with 13(*a*) a driving waveform of the FLC-OASLM, 13(*b*) a driving waveform of the writing LD, 13(*c*) a driving waveform of the reading LD, and 13(*d*) an optical response of the FLC-OASLM.

FIGS. 18(*a*) to 18(*f*) and 19(*a*) to 19(*f*) are diagrams showing example operation waveforms of the optical pattern recognition system, with 18(*a*), 19(*a*) representing a drive waveform of the FLC-OASLM having a dielectric mirror, 18(*b*), 19(*b*) a drive waveform of the FLC-OASLM having no dielectric mirror, 18(*c*), 19(*c*) a drive waveform of a writing LD, 18(*d*), 19(*d*) a drive waveform of a reading LD, 18(*e*), 19(*e*) an optical response of the FLC-OASLM having a dielectric mirror, and 18(*f*), 19(*f*) an optical response of the FLC-OASLM having no dielectric mirror.

DESCRIPTION OF THE PREFERRED EMBODIMENTS

Figure 2:
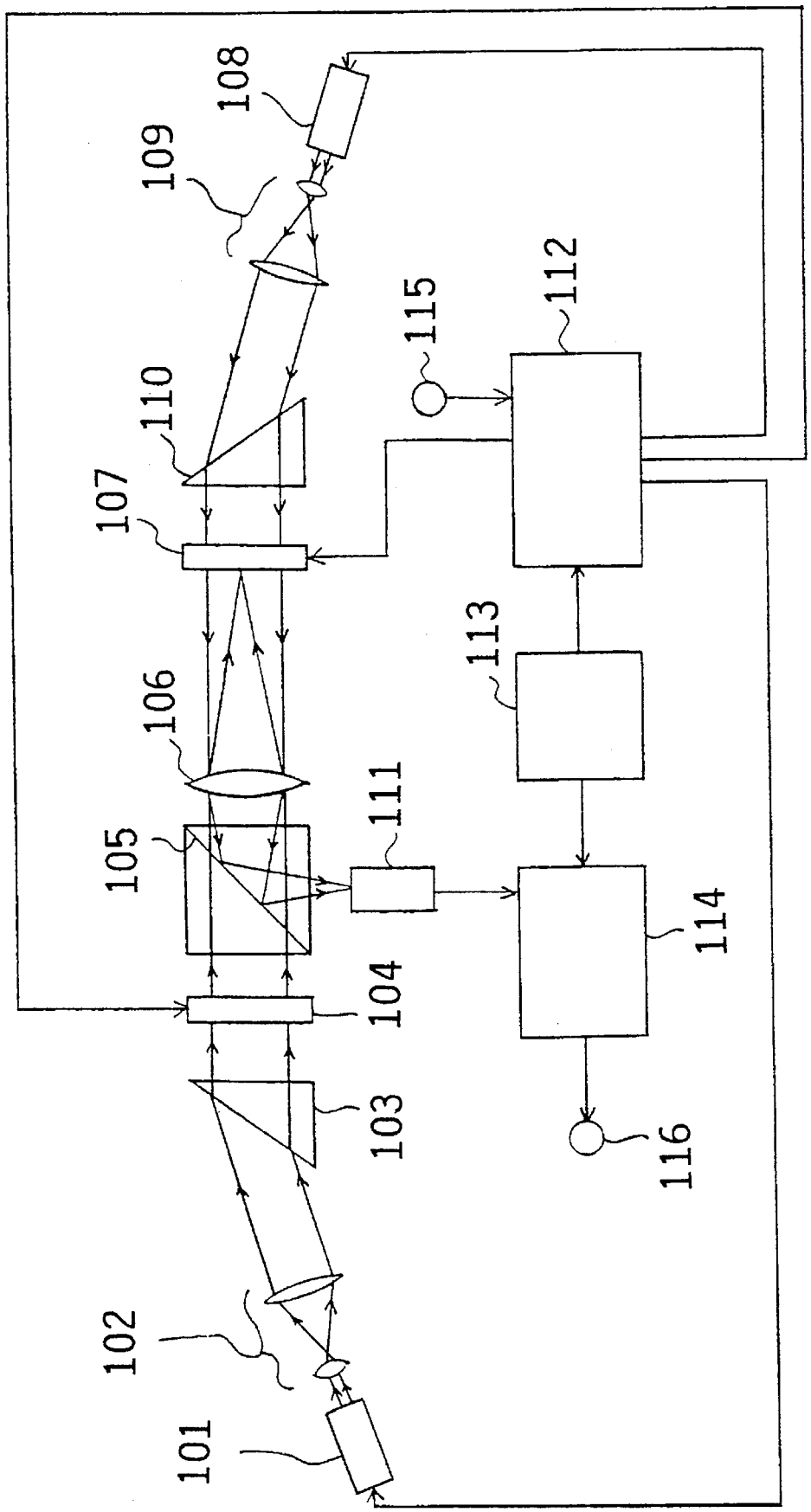
FIG. 2 is a diagram showing the configuration of an optical pattern recognition system as one embodiment of the invention.

Embodiments of the invention will be described by referring to the accompanying drawings. First, let us consider a case where an image is digitally recorded on the FLC-OASLM which has no dielectric mirror 143 and light shielding layer 142, both forming light reflection and separation layers.

FIG. 1 shows one example method of driving at high speed a ferroelectric liquid crystal spatial light modulator of this invention when digitally recording an image. FIG. 1(a) represents a drive voltage waveform applied to the FLC-OASLM with the transparent electrode 134b on the reading side grounded. FIGS. 1(b) and 1(c) represent changes over time of the writing light intensity and reading light intensity radiated against the FLC-OASLM. FIG. 1(d) shows the optical response of the FLC-OASLM. The FLC-OASLM is impressed with a drive voltage which consists of an erase pulse 1, a write pulse 2 and a zero voltage 3, these appearing repetitively in this order, as shown in FIG. 1(a). The FLC-OASLM is initialized when applied with the erase pulse 1, which is an erase voltage; it is written with an image by the write pulse 2, which is a write voltage; and the recorded image is read out during the zero voltage 3.

The writing light need only be radiated against the FLC-OASLM for the write voltage application time during which the write pulse 2 is applied. There is no need for the FLC-OASLM to be constantly irradiated with the writing light as required in the conventional FLC-OASLM. The writing light being radiated during other periods is not involved at all in the image recording. Further, the write pulse 2 and the irradiation of writing light 4 need not agree perfectly in timing, but they need only overlap for a sufficient period of time to record the image. In the case of an FLC-OASLM with no light reflection and separation layers, it can be irradiated with the writing light either from the writing side or from the reading side.

The reading light need only be interrupted for the write voltage application time during which the write pulse 2 is applied. In this case, even when a strong reading light is radiated, the reading light does not affect the photoconductive layer 137 during writing, so that the writing characteristic will not change nor will the digitally recorded image degrade. The image can be read out if the reading light irradiation 9 overlaps all or a part of the period of the zero voltage 3. However, considering the low reading light reflection factor, which stems from the absence of the dielectric mirror 143, radiating the reading light over the entire period of the zero voltage 3 produces a greater amount of light of the image being read out and more convenient for later processing. When the reading light is not emitted for the erase voltage application time in which the erase pulse 1 is applied, the recorded image becomes hard to erase because the dark-state threshold voltage is higher than the lighted-state threshold voltage. In that case, the image can be erased by applying the erase pulse sufficiently higher than the dark-state threshold voltage 1. It is desirable to radiate the reading light 9 also in the erase voltage application time during which the erase pulse 1 is emitted because the image erasure becomes easier and the pulse width or voltage of the erase pulse 1 can be reduced. The light intensity of the image being read out becomes zero when the erase pulse 1 is applied because it erases the recorded image, as shown in FIG. 1(d).

When the FLC-OASLM is driven in a way mentioned above, since the reading light does not affect the photoconductive layer 137, the writing characteristic is not affected at all even when a strong reading light is used. This allows the use of a strong reading light which makes up for the lack of the dielectric mirror 143 and the low reading light reflection factor. This in turn makes it possible to process the image read out and record it in another spatial light modulator, without causing such problems as lack of light amount or sensitivity. An example apparatus that processes the image that was read out will be detailed later. The widths of the erase pulse 1, write pulse 2 and zero voltage 3 can be made less than 1 msec while keeping the FLC-OASLM operable, although the actual widths depend on the intensity of the writing and reading light. The reduction of the pulse widths permits a high-speed operation at frequency of more than 300 Hz. Various drive voltage waveforms other than the one shown in FIG. 1(a) are possible. For example, the drive voltage waveform may have the zero voltage 3 between the erase pulse 1 and the write pulse 2. As long as the operation process consists of initializing and recording an image by a pulse-like drive voltage and reading the image during the period of the zero voltage 3 after the write pulse 2, the above explanation applies to any drive voltage waveform.

Next, we will explain about the process of recording an image with tonal variations on the FLC-OASLM that does not have a dielectric mirror 143 and a light shielding layer 142, both forming light reflection and separation layers. FIG. 4 shows one example method of driving at high speed the ferroelectric liquid crystal spatial light modulator of this invention when recording an image with tonal variations. FIG. 4(a) shows a drive voltage waveform applied to the FLC-OASLM with the transparent electrode 134b on the reading side grounded. FIG. 4(b) and 4(c) show changes over time of the writing and reading light intensities applied to the FLC-OASLM. FIG. 4(d) shows the light intensity of an image read from the FLC-OASLM. The drive voltage waveform shown in FIG. 4(a) is the drive voltage waveform of FIG. 1(a)—which consists of an erase pulse 1, a write pulse 2 and a zero voltage 3, appearing repetitively in that order—superimposed with a bias voltage. The dc bias voltage is superimposed so that a positive pulse voltage (erase pulse 51) is larger than a negative pulse voltage (write pulse 52) and that the write pulse 52 is no higher than the threshold voltage in the illuminated state. As in the binary recording, the recording of an image with tonal variations consists of initializing by the erase pulse or an erase voltage and writing an image by the write pulse or a write voltage. Because a dc bias voltage is superimposed on the drive voltage, the recorded image is read during the period of a bias voltage 53, not the zero voltage 3 of FIG. 1(a).

If the pulse voltage superimposed with the dc bias voltage is applied between the transparent electrodes 134a, 134b, a voltage proportional to the intensity of light radiated against the photoconductive layer 137 is applied to the ferroelectric liquid crystal layer 136 during the process of writing. The ferroelectric liquid crystal molecules are acted upon by a force proportional to the voltage. At the same time, the ferroelectric liquid crystal molecules are also acted upon by a relaxing force tending to return it to the original stable state because of the asymmetry of the applied voltage. The reversing angle of the ferroelectric liquid crystal molecules when applied with the write pulse 52 increases almost proportionally with the writing light intensity and, when either the write pulse 52 or the writing light irradiation 54 disappears, decreases with time. The period of the reversing angle reduction depends on the relaxing time of the ferroelectric liquid crystal molecules, so that the asymmetric pulse voltage should preferably have a frequency of more than about 100 Hz. Because the light intensity of the image read out is proportional to the reversing angle of the ferroelectric liquid crystal molecules, reading the image by radiating the reading light during this reduction period permits the image with continuous tone variations to be written and read continually.

In writing and reading an image which has a tonal gradation, the intensity of the writing light should be modulated so that there is a writing light radiation 54 only for the write voltage application time during which the write pulse 52 is impressed, as in the case of binary-recording the image. The write voltage application time and the writing light radiation 54 need only overlap each other for a specified period of time, and the writing light radiation 54 may be either shorter or longer than the write pulse 52.

The reading light should be emitted during a period other than the write voltage application time during which the write pulse 52 is applied. During the period of the bias voltage 53, the ferroelectric liquid crystal molecules tend to return to the original stable state by the relaxing force. During this state, emitting strong reading light does not affect the relaxing state and causes the image with tonal gradation to be read out. It is noted that the reading light radiation 55 need not match the period of the bias voltage 53 and may be shorter than the bias voltage period or overlap the erase voltage application time in which the erase pulse 51 is applied. In the case of binary recording, it is desired that the reading light radiation 9 exit when the erase pulse 1 is applied because the erase operation is facilitated by the reading light. This is also true of the writing of an image with tonal variation. However, since the image can normally be erased without the reading light, the reading light does not have to be radiated during the erase voltage application time.

The light intensity 56 of the image read out is proportional to the writing light intensity and is strongest immediately after reading and weakens as the reversing angle of the ferroelectric liquid crystal molecules becomes small by the relaxing force. When the erase pulse 51 is applied, the reversing angle becomes zero, causing the light intensity of the image read out to go zero.

In the FLC-OASLM having no light reflection and separation layers, the above process of image reading enables an image with tonal gradation to be written into and read out at high speed of 100 Hz even when using a strong reading beam. Various drive voltage waveforms other than the one shown in FIG. 4(a) are possible. For example, the drive voltage waveform may have the bias voltage 53 between the erase pulse 51 and the write pulse 52. As long as the operation process consists of initializing and recording an image by a pulse-like drive voltage and reading the image during the period of the bias voltage 53 after the write pulse 52, the above explanation applies to any drive voltage waveform. The bias voltage 53 for reading the image need not necessarily be in a bias voltage state but may be a drive voltage waveform in a zero voltage state.

Next, we will explain about the method of modulating the intensities of the writing and reading light. When a laser diode (LD) is used as a light source of the writing and reading light, the drive voltage of the FLC-OASLM and the drive current of the LD are synchronized by a controller to directly modulate the LD-driving current so that it has a waveform almost similar to the desired light intensity. This makes it possible to easily modulate the light intensity by synchronizing the writing and reading light with the FLC-OASLM.

However, considering the coherence of the emitting light, commonly used lasers include gas lasers such as He-Ne laser and argon laser and solid lasers such as ruby laser. When these lasers are used as a source of writing and reading light beams, it is very difficult to directly modulate the light source and furthermore it is impossible to modulate the intensities of the writing and reading light by synchronizing the light with the FLC-OASLM, which operates at high speed from several tens of Hz to several kHz, through the use of mechanical shutter or liquid crystal shutter that uses TN liquid crystal as the light modulating material.

Figure 6A:
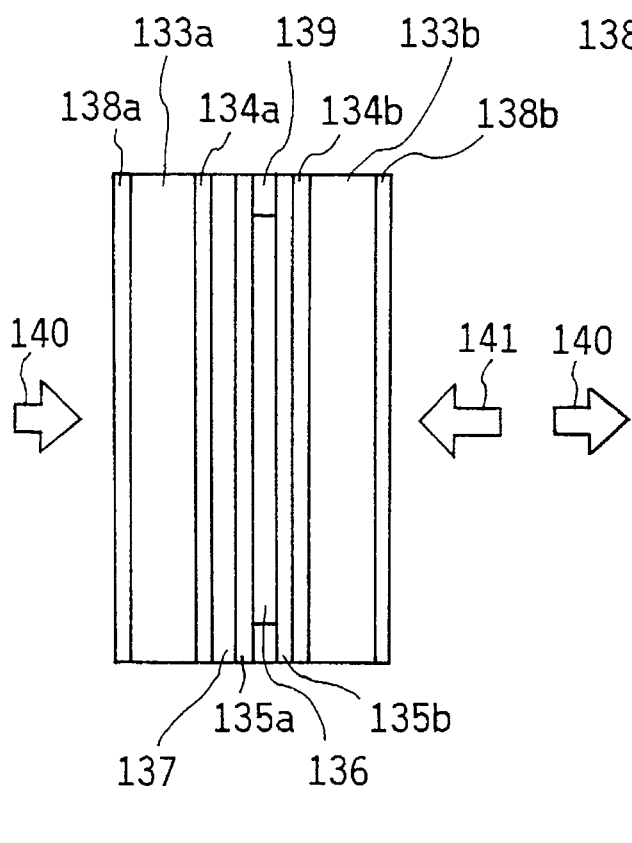
FIG. 6 is a diagram showing the configuration of one example of FLC-OASLMs used in this invention, with FIG. 6(*a*) representing an FLC-OASLM having no light reflection layer and FIG. 6(b) representing an FLC-OASLM having a light reflecting layer.

The method of modulating at high speed the writing and reading light emitted from an arbitrary light source by using a liquid crystal shutter that uses a ferroelectric liquid crystal as the light modulating material (FLC shutter) is explained as follows. The FLC shutter has a construction similar to that of the FLC-OASLM without the light reflection layer shown in FIG. 6(a) except that it has no photoconductive layer 137. The only points in which the FLC shutter differs from the FLC-OASLM of FIG. 6(a) are that there is no photoconductive layer 137, that the liquid crystal molecules are reversed by the voltage applied between the transparent electrodes 134a, 134b, and that the FLC shutter is used as a transmission type. The operation principles behind them are the same. The direction of alignment of liquid crystal molecules and the direction of linear polarized light irradiating the FLC shutter are the same as those of the conventional ferroelectric liquid crystal spatial light modulator. The FLC shutter has a polarizer and a detector in front and back thereof to modulate the intensities of the reading and writing light. The FLC shutter has a bistable characteristic in memory and provides high response and contrast. The FLC shutter used in this invention was found to be able to perform at a contrast of 500:1 or higher and a frame frequency of up to several kHz.

Figure 5:
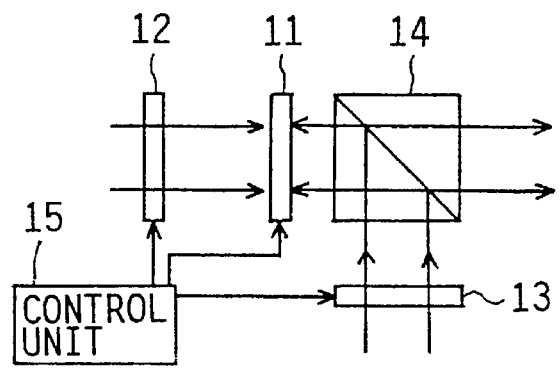
FIG. 5 is a diagram showing the configuration of one embodiment that uses the high-speed driving method for FLC-OASLM according to this invention.

FIG. 5 shows one embodiment of a high-speed driving device for the ferroelectric liquid crystal spatial light modulator of this invention in which two FLC shutters mentioned above are arranged in the paths of the writing and reading light of the FLC-OASLM. The drive means for driving the FLC-OASLM 11 is a control unit 15; the writing light modulating means is a first FLC shutter 12; the reading light modulating means is a second FLC shutter 13; and the control unit 15 synchronizes the drive means, the writing light modulating means, and the reading light modulating means with each other.

The writing light whose intensity is modulated by the first FLC shutter 12 radiates against the writing surface of the FLC-OASLM 11. The reading light whose intensity is modulated by the second FLC shutter 13 is reflected by the polarized beam splitter 14 to irradiate the reading surface of the FLC-OASLM 11. The reading light reflected from the FLC-OASLM 11 passes through the polarized beam splitter 14, which works as a detector, to read the recorded image. The FLC-OASLM 11, the first FLC shutter 12, and the second FLC shutter 13 are driven and synchronized by the control unit 15.

FIG. 7 shows the method of driving the FLC-OASLM 11 and the two FLC shutters 12, 13 in this embodiment. FIG. 7(a) represents a drive voltage waveform applied to the FLC-OASLM with the transparent electrode 134b on the reading side grounded. FIG. 7(b) shows changes in the intensity of the writing light. FIG. 7(c) shows a drive voltage waveform for the first FLC shutter 12 to modulate the writing light. FIG. 7(d) represents changes in the intensity of the reading light. FIG. 7(e) shows a drive voltage waveform for the second FLC shutter 13 to modulate the reading light. The FLC shutters 12, 13 are so set as to close when applied with positive pulses (referred to as a close-pulse 5 or 7) and open when applied with negative pulses (referred to as an open-pulse 6 or 8). In synchronism with the timing that the write pulse 2 is applied to the FLC-OASLM 11, the open-pulse 6 is applied to the first FLC shutter 12 and the close-pulse 7 to the second FLC shutter 13. When the FLC-OASLM 11 becomes a zero voltage state 3, the first FLC shutter 12 is applied with the close-pulse 5 and the second FLC shutter 13 with the open-pulse 8. Operating the FLC-OASLM and the two FLC shutters in synchronism with each other in this way realizes the driving method of FIG. 1.

So far, we have described the high-speed driving method for only one FLC-OASLM. With this method it is possible to realize a variety of system configurations using multiple FLC-OASLMs, as by connecting two or more FLC-OASLMs in series, processing an image read out from the FLC-OASLM and recording it in another FLC-OASLM. This will be explained by taking for example a joint transform correlator in which two FLC-OASLMs with no light reflection and separation layers are connected in series.

Figure 8:
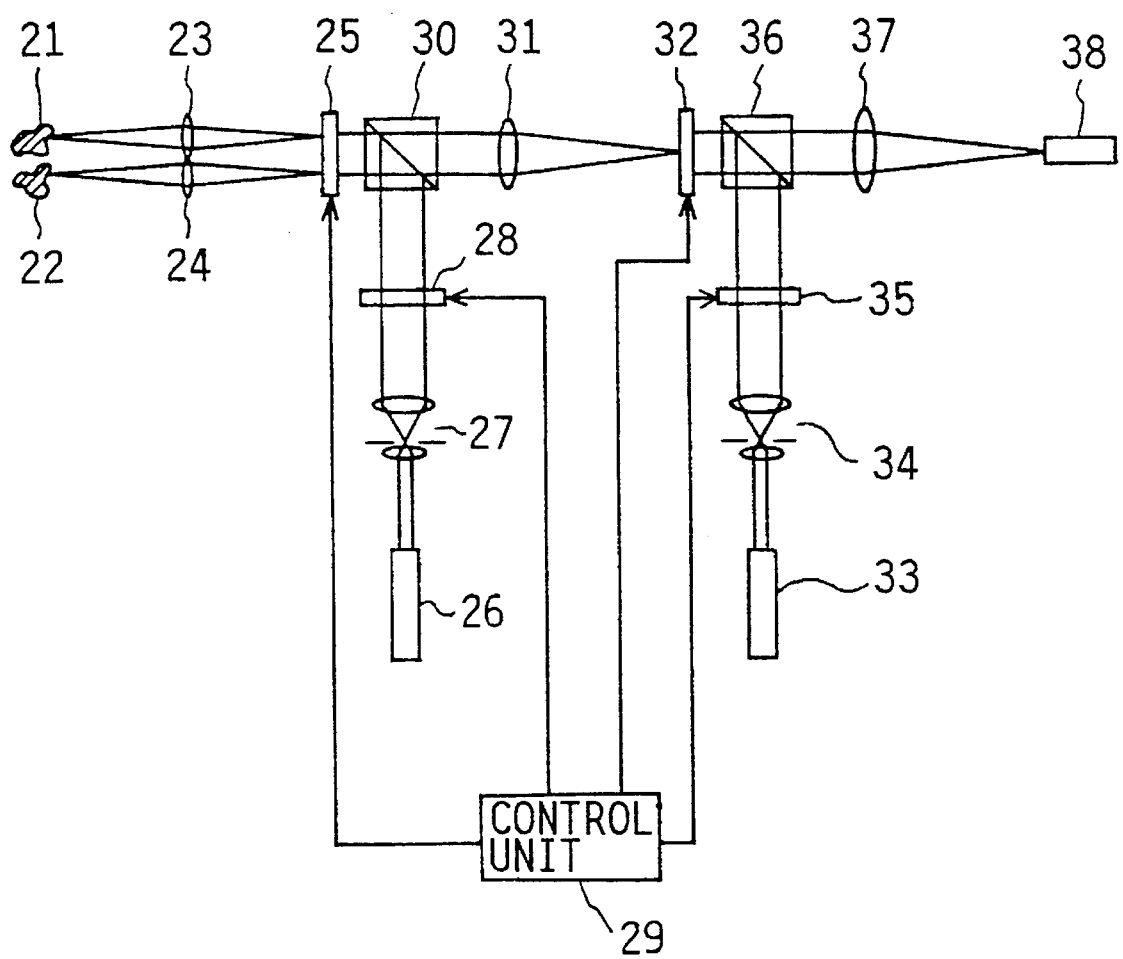
FIG. 8 is a diagram showing the configuration of one embodiment that performs a pattern recognition using the high-speed driving method for FLC-OASLM according to this invention.

FIG. 8 shows the configuration of one embodiment that perform pattern recognition using the high-speed driving method for the ferroelectric liquid crystal spatial light modulator of this invention. This is a joint transform correlator that uses two FLC-OASLMs without light reflection and separation layers. A drive means for driving the first FLC-OASLM 25 and the second FLC-OASLM 32 is a control unit 29. A first FLC shutter 28 works as a reading light modulating means for the first FLC-OASLM 25 and also as a writing light modulating means for the second FLC-OASLM 32. A reading light modulating means for the second FLC-OASLM 32 is a second FLC shutter 35. The control unit 29 also synchronizes the operation of the first FLC-OASLM 25 and the second FLC-OASLM 32 with the writing light modulating means and the reading light modulating means.

Figure 10:
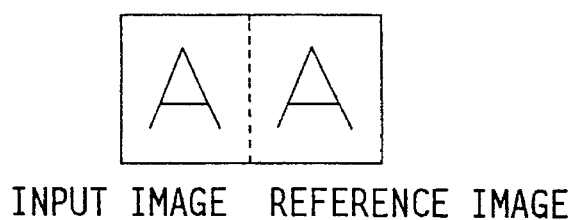
FIG. 10 is a diagram showing one example object image in the joint transform correlator.

A reference object 21 and an input object 22 are focused on the photoconductive layer of the first FLC-OASLM 25 by a first focusing lens 23 and a second focusing lens 24, respectively, and the focused images are recorded there as a reference image and an input image. Coherent light radiated from a first laser 26 is made a parallel-ray beam of a specified diameter by a first beam expander 27 and as it passes through the first FLC shutter 28, the light intensity is modulated. The modulated coherent light is reflected as reading light by a first polarized beam splitter 30 onto the reading surface of the first FLC-OASLM 25. The reading light reflected by the first FLC-OASLM 25 passes through the first polarized beam splitter 30, which is used as a detector, causing the reference image and the input image recorded on the first FLC-OASLM 25 to be read out as coherent positive or negative images. The coherent images thus read out are Fourier-transformed by a first Fourier transform lens 31 and their joint Fourier-transformed image is radiated as writing light against the writing surface of the second FLC-OASLM 32. As a result, the joint Fourier-transformed image is converted into an intensity distribution image which is recorded on the second FLC-OASLM 32. Coherent light emitted from a second laser 33 is passed through a second beam expander 34, a second FLC shutter 35 and a second polarized beam splitter 36 to become a parallel-ray beam of a specified diameter before being modulated in its intensity and radiated as the reading light against the reading surface of the second FLC-OASLM 32. The reading light reflected from the second FLC-OASLM 32 passes through the second polarized beam splitter 36, which is used as a detector, causing the light intensity distribution image of the joint Fourier-transformed image recorded on the second FLC-OASLM 32 to be read out as a positive or negative image. The light intensity distribution image thus read out is Fourier-transformed by a second Fourier transform lens 37 to produce correlation peaks on a light reception element 38, which are then converted into electric signals. If the input image and the reference image, shown close together in FIG. 10, are located at coordinates (x+a, y+b) and (x−a, y−b), then a pair of correlation peaks appear at positions (±a, ±b). If there are a plurality of reference images and the input image is located at a position (x, y) and the reference images at positions (x+$a_i$, y+$b_i$) where i is a natural number, then the correlation peaks appear at positions (±$2a_i$, ±$2b_i$). The first FLC-OASLM 25 is driven and synchronized with the first FLC shutter 28, the second FLC-OASLM 32, and the second FLC shutter 35 by signals from the control unit 29. The first FLC-OASLM 25 is placed on the front focusing plane of the first Fourier transform lens 31 and the second FLC-OASLM 32 on the rear focusing plane. The second FLC-OASLM 32 is put on the front focusing plane of the second Fourier conversion lens 37 and the light reception element 38 on the rear focusing plane.

Now, we will describe the operation. FIG. 9 shows one example method of driving the embodiment of FIG. 8. FIG. 9(a) shows changes in the intensity of the writing light radiated against the first FLC-OASLM 25. FIG. 9(b) shows a drive voltage waveform for the first FLC-OASLM 25 with the transparent electrode 134b on the reading side grounded. FIG. 9(c) shows changes in intensity of the reading light radiated against the first FLC-OASLM 25. FIG. 9(d) represents a drive voltage waveform of the first FLC shutter 28. FIG. 9(e) represents changes in light intensity of an image read out from the first FLC-OASLM 25. FIG. 9(f) represents a drive voltage waveform for the second FLC-OASLM 32 with the transparent electrode 134b on the reading side grounded. FIG. 9(g) shows changes in intensity of the reading light radiated against the second FLC-OASLM 32. FIG. 9(h) represents a drive voltage waveform of the second FLC shutter 35. FIG. 9(i) represents changes an light intensity of an image read out from the second FLC-OASLM 32. The first FLC-OASLM 25 and the second FLC-OASLM 32 record images in binary. When the recording of an image with tonal gradation is performed, the bias voltage need only be superimposed on the drive voltage to be applied to the FLC-OASLM.

For simplicity, suppose that the writing light is constantly radiated against the writing surface of the first FLC-OASLM 25. When the drive voltage of FIG. 9(b) is applied to the first FLC-OASLM 25, the write pulse 62 of the drive voltage causes the reference image and the input image to be digitally recorded. The recorded image is read out during the zero voltage 63 and erased by the erase pulse 61. The writing light intensity may be modulated as when the reference object 21 and the input object 22 are irradiated with a pulsating light source like a strobe light. In that case, the pulsating light source and the first FLC-OASLM 25 must be synchronized with each other and the writing light irradiation and the writing pulse 62 must overlap for a specified period of time.

The reading light that irradiates the first FLC-OASLM 25 has its intensity modulated in such a way that it is interrupted only when the write pulse 62 is applied. As a result, the reading light, even if it is strong, does not affect the writing characteristic of the first FLC-OASLM 25 and can read out the recorded reference and input images during the period of the zero voltage 63. Radiating the reading light also during application of the erase pulse 61 makes it easy to erase the image, which in turn allows reduction in the pulse with and voltage of the erase pulse 61. Such intensity-modulated reading light can be obtained by applying the drive voltage of FIG. 9(d) to the first FLC shutter 28. The first FLC shutter 28 closes when applied with a positive pulse voltage (close-pulse 65) and opens when applied with a negative pulse voltage (open-pulse 66). The drive voltage for the first FLC shutter 28 is synchronized with the drive voltage for the first FLC-OASLM 25. At the same time that the write pulse 62 is applied to the first FLC-OASLM 25, the close-pulse 65 is given to the first FLC shutter 28. When the first FLC-OASLM 25 enters the state of zero voltage 63, the first FLC shutter 28 is applied with an open-pulse 66.

FIG. 9(e) shows changes in light intensity of an image read out from the first FLC-OASLM 25. The image is read out only when the reading light is radiated and the drive voltage is at the zero voltage 63. When the erase pulse 61 is applied, the image is erased even if the reading light continues radiating, causing the intensity of the image being read to become zero.

The drive voltage of FIG. 9(f) is applied to the second FLC-OASLM 32 so that the write pulse 68 is synchronous with a period during which the image is read out from the first FLC-OASLM 25. When the write pulse 68 is applied, the joint Fourier-transformed image read out from the first FLC-OASLM 25 is radiated onto the writing surface of the second FLC-OASLM 32, digitally recording its intensity distribution. The recorded image is read out when the drive voltage is at the zero voltage 69, and erased by the erase pulse 67.

The reading light emitted onto the second FLC-OASLM 32 is intensity-modulated so that it is interrupted only when the write pulse 68 is applied to the second FLC-OASLM 32. Since the reading light is left radiating also during the application of the erase pulse 67, the pulse width and voltage of the erase pulse 67 can be reduced as in the case of the first FLC-OASLM 25.

Such intensity-modulated reading light can be obtained by applying the drive voltage of FIG. 9(h) to the second FLC shutter 35. The instant the write pulse 68 is applied to the second FLC-OASLM 32, a close-pulse 71 is given to the second FLC shutter 35. At the same time that the second FLC-OASLM 32 goes to the zero voltage 69, an open-pulse 72 is applied to the second FLC shutter 35.

FIG. 9(i) shows changes in light intensity of an image read out from the second FLC-OASLM 32. The image is read out only when the drive voltage for the second FLC-OASLM 32 is at the zero voltage 69.

With the above method, it is possible to operate the correlator at speeds higher than 300 Hz also in a system where two FLC-OASLMs without light reflection and separation layers are connected in series. The light reception element 38 produces a correlation peak intensity which represents the correlation coefficient between the reference object 21 and the input object 22. By using the similar method, more than two FLC-OASLMs can be connected in series, in loop or in tree configuration to form a system that allows high-speed operation.

The above description concerns a case where the FLC-OASLMs do not have such light reflection and separation layers as a dielectric mirror 143 and a light shielding layer 142. Where the light reflection and separation layers are provided, the operations such as high-speed sampling of an image read out or writing and reading the image on a time-sharing basis require light intensity modulation of the writing light and the reading light. Since in this case there are light reflection and separation layers, the reading light is separated from the writing light and does not affect the writing characteristic. Hence, there is no problem if the writing light is radiated during the write voltage application time. In the foregoing description, where the light reflection and separation layers are not provided, the image is read out in the zero voltage state in the case of binary recording and, in the case of recording of an image with tonal gradation, is read out in the bias voltage state. On the contrary, where the light reflection and separation layers are provided, radiating the reading light during the write voltage application time enables the image to be read out even in this write state, making the zero voltage state and the bias voltage state unnecessary for the drive voltage waveform.

Next, referring to attached drawings, we will explain about another embodiment of the optical pattern recognition system which is reduced in size by using a laser diode. FIG. 2 shows the configuration of one embodiment of the optical pattern recognition system according to this invention. Designated 101 is a laser diode (LD) for writing, 102 a first collimator lens, 103 a first beam forming prism, 104 an electrically addressed type spatial light modulator, 105 a polarized light beam splitter, 106 a Fourier transform lens, 107 an FLC-OASLM, 108 a laser diode (LD) for reading, 109 a second collimator lens, 110 a second beam forming prism, 111 a photodiode, 112 a drive control circuit, 113 a power supply, 114 an amplifier, 115 an image input terminal, and 116 an output terminal. Means for transforming into a coherent image at least one reference image including specified marks and at least one input image to be entered, both images being displayed on the image display means, includes the writing LD 101, first collimator lens 102, first beam forming prism 103, electrically addressed type spatial light modulator 104, polarized light beam splitter 105, image input terminal 115, drive control circuit 112 and power supply 113. Means for optically Fourier-transforming the coherent image and producing a joint Fourier-transformed image of the reference image and the input image is a Fourier transform lens 106. Means for converting the joint Fourier-transformed image into an intensity distribution image and displaying the intensity distribution image on the optically addressed type spatial light modulator includes an FLC-OASLM 107, drive control circuit 112, and power supply 113. Means for reading the intensity distribution image displayed on the optically addressed type spatial light modulator by using the coherent light includes a laser diode for reading 108, second collimator lens 109, second beam forming prism 110, drive control circuit 112 and power supply 113. Means for Fourier-transforming the intensity distribution image read out into a two-dimensional correlation image distribution of the reference image and the input image includes a Fourier transform lens 106 and a polarized light beam splitter 105. A light-electricity conversion element for detecting the intensity of correlation peaks that correspond to the correlation coefficients between the reference image and the input image contained in the correlation image distribution includes a photodiode 111, power supply 113, amplifier 114, and output terminal 116.

Coherent writing light emitted from the writing LD 101 is expanded by the first collimator lens 102 into a parallel-ray beam of a specified diameter, which is then formed into a circular beam by the first beam forming prism 103. The circular beam is radiated against the electrically addressed type spatial light modulator 104. In this example, the beam diameter is set at 10 mm. The electrically addressed type spatial light modulator 104 is supplied video signals or digital image signals from computer, image processing system or CCD camera via the image input terminal 115 and displays an object image as shown in FIG. 10. The object image in FIG. 10 consists of two alphabets "A" displayed close together, one as input image and one as reference image. The input image and the reference image may each be plural in number. The electrically addressed type spatial light modulator 104 used in this invention will be detailed later.

The coherent writing light radiated onto the electrically addressed type spatial light modulator 104 converts the object image displayed on the modulator into a coherent image, which is incident on the polarized light beam splitter 105. The polarization direction of light emitted from the writing LD 101 is preset 50 that the coherent image will enter the polarized light beam splitter 105 in a parallel polarization state. Hence, almost all of the coherent image passes through the polarized light beam splitter 105 and becomes Fourier-transformed by the Fourier transform lens 106 before striking the writing surface of the FLC-OASLM 107 placed on the Fourier transform plane. In this way, as in the preceding case, the joint Fourier-transformed image of the input image and the reference image is digitally recorded and displayed as a binary light intensity distribution image on the FLC-OASLM 107. The FLC-OASLM 107 is a transmission type FLC-OASLM with no light reflection layer shown in FIG. 6(a) and uses an intrinsic hydrogenated amorphous silicon layer 2–3 μm thick for the photoconductive layer 137. It should be noted that the photoconductive layer 137 may use a hydrogenated amorphous silicon layer that has a pin junction structure. Since the light sensitivity of the hydrogenated amorphous silicon layer becomes low for the light whose wavelength is more than about 900 nm, recording the joint Fourier-transformed image on the FLC-OASLM 107 requires the writing LD 101 to have the oscillation wavelength of less than about 900 nm. It is preferable to use a writing LD 101 that has the oscillation wavelength of less than 700 nm. In this embodiment the writing laser diode 101 has the oscillation wavelength of 780 nm and the output of 30 mW.

Coherent reading light radiated from the reading laser 108 is expanded by the second collimator lens 109 into a parallel-ray beam of a specified diameter, which is then formed into a circular beam by the second beam forming prism 110 before being radiated against the reading surface of the FLC-OASLM 107. While the beam diameter of the reading light in this embodiment is set to 8 mm, it depends on the spatial frequency region of the joint Fourier-transformed light intensity distribution being considered. As mentioned earlier, since the FLC-OASLM 107 employs an intrinsic hydrogenated amorphous silicon layer as the photoconductive layer, if the oscillation wavelength of the reading LD 108 is greater than 660 nm, the reading light passes through the FLC-OASLM 107. If possible, it is desirable to use the writing LD 108 whose wavelength is more than 800 nm. This embodiment uses the reading LD 108 with the oscillation wavelength of 780 nm. While this is the same as the oscillation wavelength of the writing LD 101, the oscillation wavelengths of these LDs need not necessarily be equal. The joint Fourier-transformed image can be read out as a positive or negative image by aligning the polarization direction of the reading light with the direction of the liquid crystal molecules aligned by initialization (or with a direction perpendicular to the molecule alignment direction) beforehand and by passing the reading light through the detector whose polarizing axis is set perpendicular or parallel to the polarization direction of the reading light, which has passed through the FLC-OASLM. In this embodiment the detector uses a polarized light beam splitter 105. It is desired that the polarized light beam splitter 105 have reflection and transmission characteristics that are little dependent on the angle of incidence and on wavelength. The joint Fourier-transformed image this read out is Fourier-transformed by the Fourier transform lens 106 and only the s-polarized light component of the image is reflected by the polarized light beam splitter 105 to produce a correlation function between the input image and the reference image on the photodiode 111. In the joint transform correlator, the correlation peak included in the correlation function appears at a position determined by a relative distance between the input image and the reference image. If the light-electricity conversion surface of the photodiode 111 is set at a position where the correlation peak appears, the correlation peak intensity that corresponds to the correlation coefficient between the input image being considered and the reference image is obtained as a voltage output of the photodiode 111. Where there are multiple reference images or input images, a plurality of correlation peak pairs appear, so that it is necessary to use a plurality of photodiodes or multi-faced photodiode having a plurality of light-electricity conversion surfaces, or a photodiode array.

An electric signal representing the correlation peak intensity that corresponds to the correlation coefficient between the detected input image and the reference image is amplified by the amplifier 114 and sent from the output terminal 116 to other processing system. The amplifier 114 is supplied by the power supply 113.

The electrically addressed type spatial light modulator 104 is placed on the front focus plane of the Fourier transform lens 106, the FLC-OASLM 107 is placed on the rear focus plane of the lens 106, and the photodiode 111 is placed on the rear focus plane of the lens 106.

Figure 11:
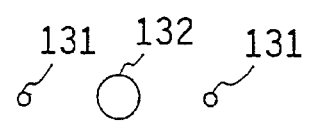
FIG. 11 is a diagram showing one example correlation peak in the joint transform correlator.

The electrically addressed type spatial light modulator 104 displays the input image and the reference image simultaneously close together, as shown in FIG. 10. At this time, the light intensity distribution corresponding to the correlation function as shown in FIG. 11 is produced on the correlation plane including the light-electricity surface of the photodiode 111. Thus, by placing the photodiode 111 so that its light-electricity conversion plane is located where the correlation peak appears, it is possible to detect only the desired correlation peak intensity. At this time, the dc component 132, which is not necessary for pattern recognition, is removed by an optical mask because it is noise affecting the detection of the correlation peak intensity.

Figure 12:
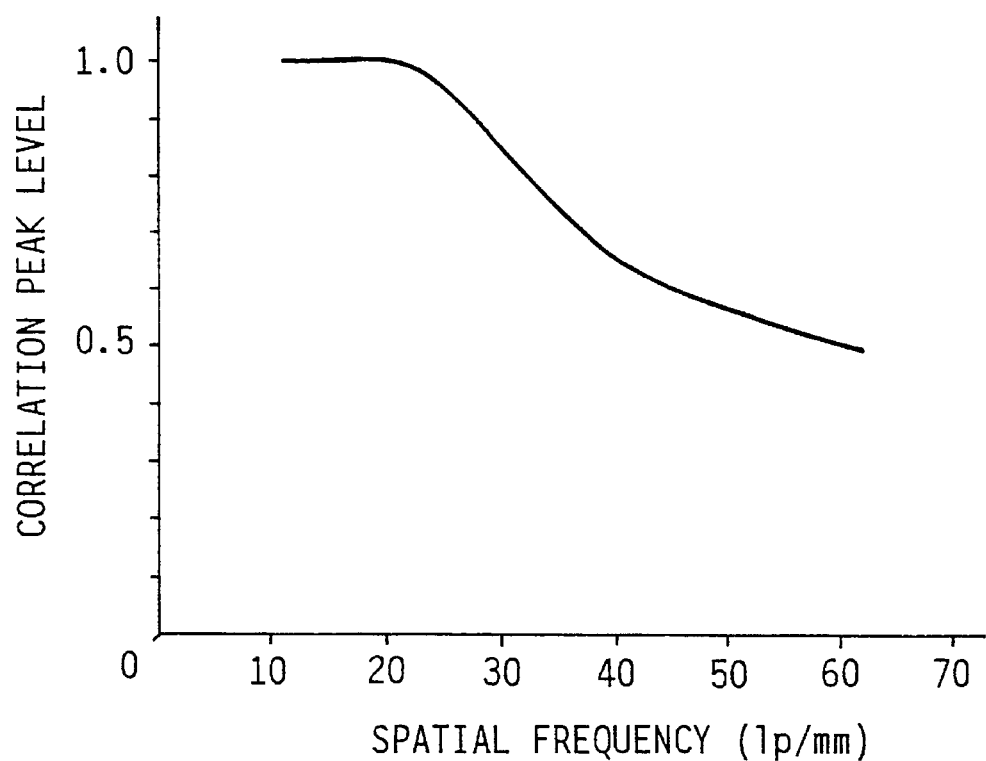
FIG. 12 is a graph showing the relationship between the spatial frequency and the correlation peak intensity of the joint Fourier-transformed image written into the FLC-OASLM in the small optical pattern recognition system of the invention.

FIG. 12 shows the relationship between the spatial frequency and the correlation peak intensity of the joint Fourier-transformed image written on the FLC-OASLM in the optical pattern recognition system of FIG. 2. As can be seen from FIG. 12, since writing the joint Fourier-transformed image onto the FLC-OASLM 107 with a high spatial frequency of 60 lp/mm results in a fall of only about 50% in the correlation peak intensity, it is possible to use a Fourier transform lens with a short focal length as small as 40–80 mm depending on the arrangement of the input image and the reference image. Further, since the Fourier transform lens that performs the joint Fourier transform and the one which performs the correlation calculation are combined into a single Fourier transform lens 106, the total length of the joint transform light correlator can be reduced to one-half the length of the conventional one. As a result, the small-sized optical pattern recognition system of this invention can be reduced in size to ⅒ to ½ of the conventional apparatus.

In this embodiment, for making the system operate in real time, the drive control circuit 112 supplied from the power source 113 drives the writing LD 101, the reading LD 108, the electrically addressed type spatial light modulator 104, and the FLC-OASLM 107 in synchronism with each other. Now, the method of driving the small-sized optical pattern recognition system of this embodiment will be described. FIG. 13 shows the relationship between the driving sequence of FLC-OASLM, writing LD and reading LD and the light response of the FLC-OASLM. FIG. 13(a) represents the drive waveform for the FLC-OASLM; FIG. 13(b) represents the drive waveform for the writing LD; FIG. 13(c) represents the drive waveform for the reading LD; and FIG. 13(d) represents the light response of the FLC-OASLM. The drive waveform for the FLC-OASLM shown in FIG. 13(a) represents voltage changes of the photoconductive layer 137 when the transparent electrode 134b on the reading side of the FLC-OASLM of FIG. 6(a), which has no light reflection layer, is grounded. As can be seen from FIG. 13, a pulse voltage is continually applied between the transparent electrodes 134a and 134b to cause the voltage polarity of the photoconductive layer 137 of the FLC-OASLM 107 of FIG. 2 to change to a positive, a negative and a zero voltage in that order repetitively to operate the FLC-OASLM 107. In the same way as explained in Summary, the polarization direction of the reading light is determined so that the joint Fourier-transformed image read out will be a positive image. The FLC-OASLM 107 erases the image when the positive voltage 144 and the reading light are simultaneously applied, writes an image when the negative voltage 145 and the writing light are applied simultaneously, and reads the image when the zero voltage 146 and the reading light are applied at the same time.

As shown in FIG. 13(b), the drive current 147 is applied to the writing LD 101 in such a way as to make the writing light irradiate the FLC-OASLM in synchronism with the negative voltage 145 applied to the FLC-OASLM 107. During other than the writing period, the drive current 147 for the writing LD 101 is set to the zero current state 148. The time during which the drive current 147 is applied to the writing LD 101 should be long enough to allow the desired joint Fourier-transformed image to be written onto the FLC-OASLM 107 and is set almost equal to the duration of the negative voltage 145. Although the time duration of the drive current 147 depends on the intensity of the writing light, it is about 0.2–5 msec in this embodiment. It was found that the writing, reading and erasing can be performed without problem if the frequency of the drive voltage waveform is less than 1–2 kHz.

As shown in FIG. 13(c), the drive current 149 is applied to the reading LD 108 while the FLC-OASLM 107 is applied with the zero voltage 146 or the positive voltage 144. The drive current is set to the zero current state 150 when at least the negative voltage 145 is being applied to the FLC-OASLM 107. Since this invention uses the FLC-OASLM 107, which has no light reflection layer, for the display of the joint Fourier-transformed image, when the positive voltage 144 is applied to the FLC-OASLM 107 while it is being irradiated with the reading light, the photoconductive layer is excited by the reading light, erasing the recorded image which represents the joint Fourier-transformed light intensity distribution. Hence, when the reading light is radiated against the FLC-OASLM 107 while it is being applied with the negative voltage 145 and written with the joint Fourier-transformed image, the writing characteristic of the FLC-OASLM 107 is affected. Of course, it is possible to deliberately apply the reading light of an appropriate intensity while the FLC-OASLM 107 is being impressed with the negative voltage 145 and written with the joint Fourier-transformed image, in order to control the writing characteristic of the FLC-OASLM 107. This method, however, is not appropriate for making the optical pattern recognition system of this invention operate at high speed. The initialization of the FLC-OASLM 107, is carried out by applying the drive current 149 to the reading LD 108 to radiate the reading light at the same time that the FLC-OASLM 107 is applied with the positive voltage 144.

The light response of the FLC-OASLM as a result of the above pulse application is shown in FIG. 13(d). FIG. 13(d) represents changes over time of the transmitted light intensity of the reading light in the FLC-OASLM 107 of this embodiment shown in FIG. 2. As is seen from this figure, the transmitted light intensity of the reading light reaches a maximum level 151 when the FLC-OASLM 107 is applied with the zero voltage 146 and a low level 152 when it is applied with the positive voltage 144. When the drive current for the reading LD 108 is at the zero current 150, the transmitted light intensity of the reading light is at the zero level 153. The FLC-OASLM 107 has a memory capability and, when applied with the zero voltage 146, is not excited at all by the reading light. This means that even if the reading light intensity is increased when the transmitted light intensity is at the maximum level 151, the image information recorded on the FLC-OASLM 107 is not lost. With this driving method for the optical pattern recognition system, a correlation peak of the desired intensity can be obtained simply by adjusting the reading light intensity, i.e., the magnitude of the drive current for the reading LD 108. The reason that the transmitted light intensity of the reading light when the positive voltage 144 is applied is not at the zero level 153 but at a low level 152, is that it is very difficult to completely block the reading light from passing through the FLC-OASLM 107.

Figure 14:
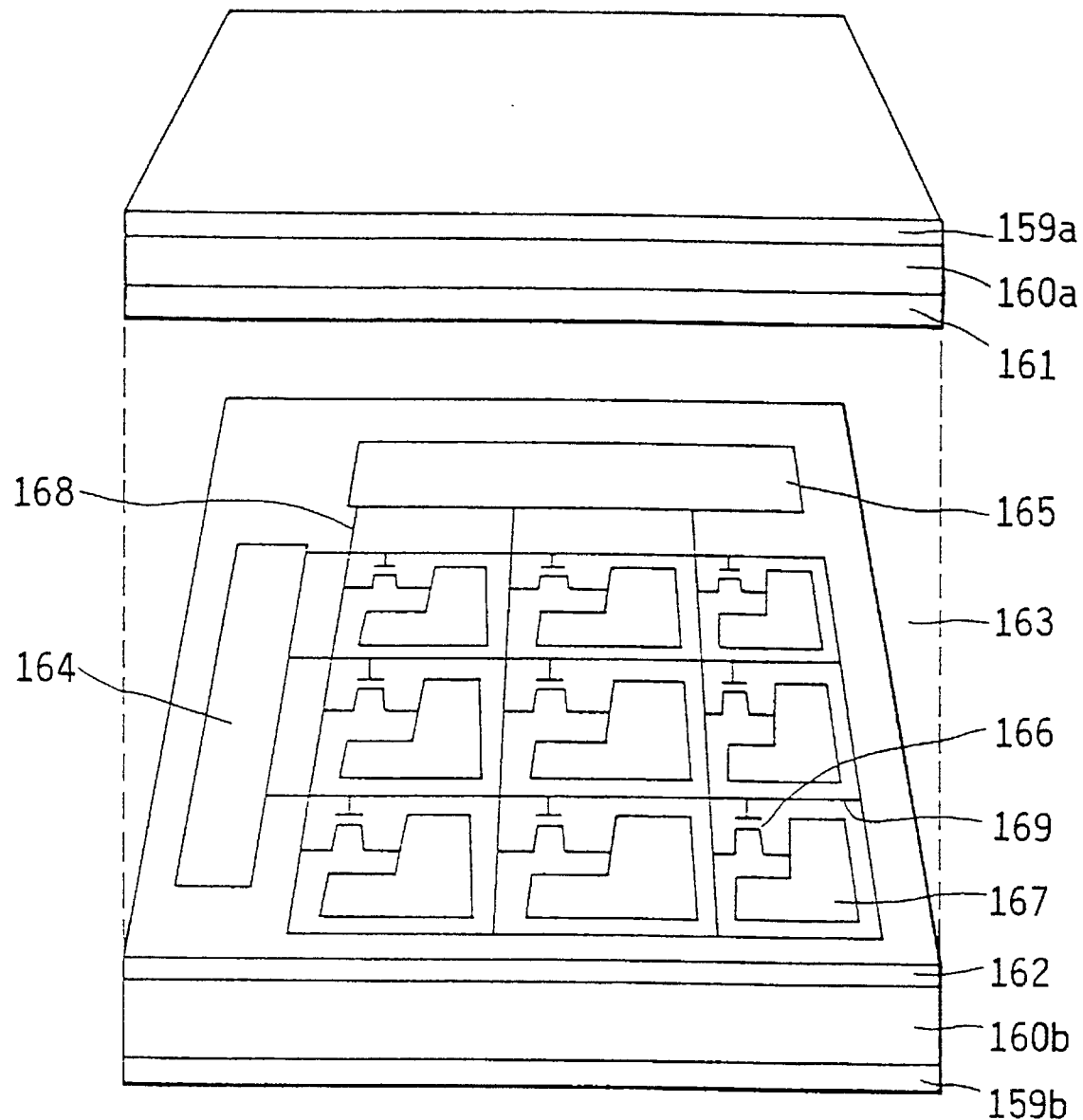
FIG. 14 is a schematic perspective view showing the construction of an electrically addressed type ferroelectric liquid crystal spatial light modulator used in this invention.

Next, we will explain about the electrically addressed type spatial light modulator 104 used in the embodiment of FIG. 2. While the FLC-OASLM 107 used in the optical pattern recognition system of this invention operates at very high speed, the electrically addressed type spatial light modulator generally requires 30 to 60 Hz for scanning one frame, which is a video rate. Hence the speed of the electrically addressed type spatial light modulator determines the operation speed of the optical pattern recognition system of the invention. Therefore, the electrically addressed type spatial light modulator 104 should preferably employ light modulating materials capable of high-speed operation. Such materials may include electro-optical ceramics like PLZT, magneto-optical materials such as yttrium iron garnet and ferroelectric liquid crystal. This embodiment employs an electrically addressed type ferroelectric liquid crystal spatial light modulator as the electrically addressed type spatial light modulator 104. FIG. 14 is a schematic perspective view showing the structure of the electrically addressed type ferroelectric liquid crystal spatial light modulator used in this invention. Denoted 159a, 159b are polarizing plates whose polarizing axes are perpendicular (or parallel) to each other. Designated 160a, 160b are glass bases, 161 a common electrode, 162 a silicon semiconductor layer formed of polycrystal silicon or monocrystal silicon, 163 a ferroelectric liquid crystal layer, 164 a Y-driver, 165 an X-driver, 166 a transistor, 167 a pixel electrode, 168 a signal line, and 169 a scanning line.

A drive circuit for the electrically addressed type ferroelectric liquid crystal spatial light modulator shown in FIG. 14 consists of an integrated circuit formed in the silicon semiconductor layer 162. This integrated circuit includes a plurality of field-effect gate transistors 166 arranged in matrix. The transistors 166 have their source electrodes connected to the corresponding pixel electrodes 167, gate electrodes connected to the scanning lines 169, and drain electrodes connected to the signal lines 168. The integrated circuit also includes the X-driver, which is connected to the column signal lines 168, and the Y-driver 164, which is connected to the row scanning lines 169.

Figure 15:
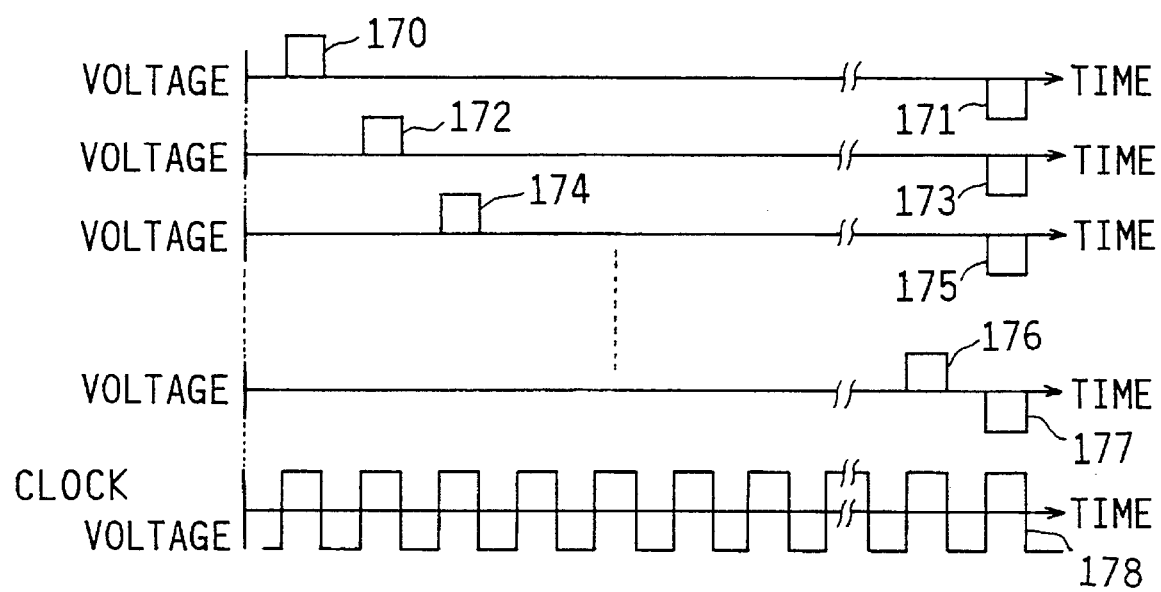
FIG. 15 is a scanning voltage waveform of the electrically addressed type ferroelectric liquid crystal spatial light modulator used in this invention.

Next, the method of inputting the image information into the electrically addressed type spatial light modulator mentioned above will be described. The image information entered from the image input terminal 115 is supplied to the X-driver 165 and the Y-driver 164. The X-driver 165 receives an x-component of the image information and the Y-driver 164 receives a y-component of the information. The x- and y-components of the image information are synchronized with each other by a clock signal. FIG. 15 shows the scanning line voltage waveforms output from the Y-driver 164 which drives the scanning lines 169. The voltages applied to the scanning lines 169 are synchronized by the clock signal 178. ON voltages 170, 172, 174, 176 applied to the first, second, third and Nth scanning line are applied to respective scanning lines with a specified time delay from one ON voltage to another. OFF voltages 171, 173, 175, 177 applied to the first, second, third and Nth scanning lines are simultaneously applied to all scanning lines after the ON voltage 176 has been applied to the Nth scanning line, which is the last scanning line of the image frame. If a specified one of the first, second and Nth signal lines is applied with ON voltage while the first scanning line is applied with the ON voltage 170, a transistor 166 attached to that pixel electrode 167 on the first scanning line which corresponds to the signal line applied with the ON voltage is excited. The excitation of the transistor 166 produces a sufficiently strong electric field to reverse the liquid crystal molecules of the ferroelectric liquid crystal layer 163 between the common electrode 161 and the pixel electrode 167 applied with the voltage. This changes the polarization characteristic of the light passing through the ferroelectric liquid crystal layer 163, allowing the pixel to be displayed. By displaying particular pixels on each scanning line successively in this way, the image information is displayed on the electrically addressed type ferroelectric liquid crystal spatial light modulator. The reading of the image information displayed on the electrically addressed type ferroelectric liquid crystal spatial light modulator is performed after the Nth or last scanning line is applied with the ON voltage 176 and all the image information is displayed until all the scanning lines are applied with the OFF voltages 171, 173, 175, 177 and all the image information is erased. It is needless to say that the clock signal 178 is either identical with or synchronized with the clock signal for the writing LD 101, the reading LD 108, and the FLC-OASLM 107.

By using the electrically addressed type ferroelectric liquid crystal spatial light modulator with the above-mentioned construction, it is possible to input images at very high speed electrically. An example embodiment using an electrically addressed type ferroelectric liquid crystal spatial light modulator with 300-by-480 pixels is described below. As shown in FIG. 10, the display area is divided into two regions of 300-by-240 pixels each, one for displaying the input image and one for the reference image. The pixels either on the input image display region or on the reference image display region need be rewritten successively. That is, only the pixel electrodes for the regions that are to be rewritten should be applied with OFF voltages 171, 173, 175, 177. When, for example, an alphabet "A" is given as an input image to be identified and it is desired to determine the alphabet of the image, the reference image need be rewritten successively to select a reference image whose correlation peak intensity is strongest, without changing the display of the input image. This operation was performed and it was found that rewriting the reference image once required less than 7 msec. Since the ferroelectric liquid crystal has a bistable memory capability, the image information is not erased unless the OFF voltage is applied to the pixel electrode. The joint Fourier-transformed image can be written reliably into the FLC-OASLM 107 in about 0.2–5 msec. Thus, the time it takes for the electrically addressed type ferroelectric liquid crystal spatial light modulator to identify the pattern is about 7.2–12 msec. This represents the speed about 3–5 times faster than the operation speed when the conventional liquid crystal display TV is used as the electrically addressed type spatial light modulator in the optical pattern recognition system of the invention.

Figure 16:
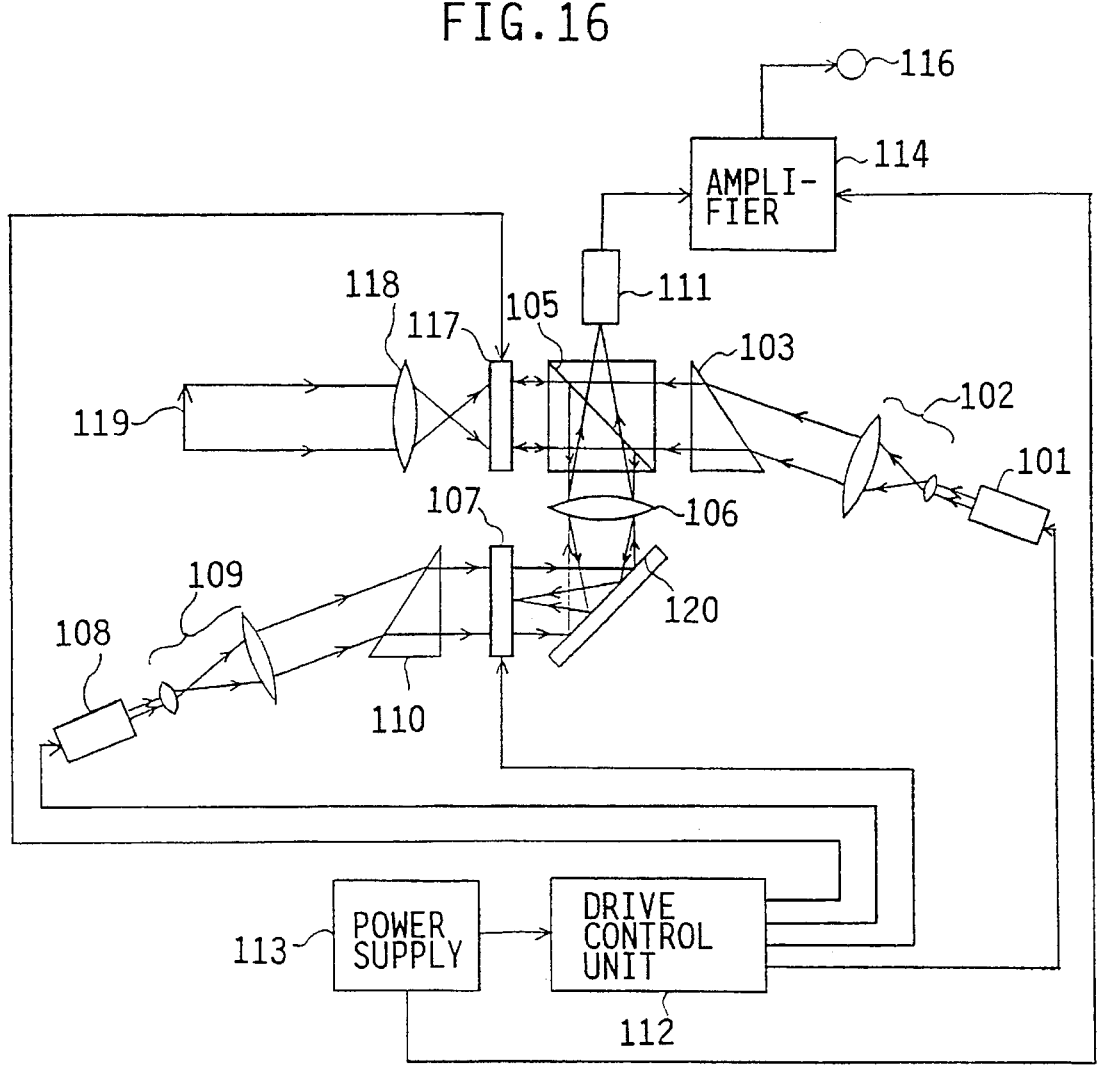
FIG. 16 is a diagram showing the configuration of an optical pattern recognition system as one embodiment of the invention.

Next, the second embodiment of the optical pattern recognition system of the invention will be explained. FIG. 16 shows the configuration of the embodiment which uses an FLC-OASLM rather than the electrically addressed type spatial light modulator as the image information input means. Designated 117 is a second FLC-OASLM, 118 a focusing lens, 119 an object to be input, and 120 a mirror. Means for transforming into a coherent image at least one reference image including specified marks and at least one input image to be entered, both images being displayed on the image display means, includes the writing LD 101, first collimator lens 102, first beam forming prism 103, second FLC-OASLM 117, polarized light beam splitter 105, drive control circuit 112 and power supply 113. Means for optically Fourier-transforming the coherent image and producing a joint Fourier-transformed image of the reference image and the input image includes a Fourier transform lens 106 and a mirror 120. Means for converting the joint Fourier-transformed image into an intensity distribution image and displaying the intensity distribution image on the optically addressed type spatial light modulator includes an FLC-OASLM 107, drive control circuit 112, and power supply 113. Means for reading the intensity distribution image displayed on the optically addressed type spatial light modulator by using the coherent light includes a laser diode for reading 108, second collimator lens 109, second beam forming prism 110, drive control circuit 112 and power supply 113. Means for Fourier-transforming the intensity distribution image read out into a two-dimensional correlation image distribution of the reference image and the input image includes a Fourier transform lens 106 and a mirror 120. A light-electricity conversion element for detecting the intensity of correlation peaks that correspond to the correlation coefficients between the reference image and the input image contained in the correlation image distribution includes a photodiode 111, power supply 113, amplifier 114, and output terminal 116.

The points in which the embodiment of FIG. 16 differs from the one shown in FIG. 2 are that the means for taking in the object image—made up of the reference image and the input image—consists of an FLC-OASLM and an optical system for focusing an image on it and that the optical system is so arranged as to make it more compact.

First, let us explain the means for taking in the input image. The object 119 to be entered may, for example, be such objects as electronic or mechanical parts or a picture formed on a photographic film. This object includes at least one reference object, which provides a reference for comparison, and at least one input object, which is to be compared with the reference object. This arrangement is similar to the object image shown in the first embodiment.

The light including the object image produced from the input object 119 is focused and displayed onto the writing surface of the second FLC-OASLM 117 by the focusing lens 118. The object image displayed on the second FLC-OASLM 117 is read out by being irradiated with the reading light, which, after being emitted from the writing LD 101, is expanded by the first collimator lens 102 into a parallel-ray beam and then formed into a circular beam by the first beam forming prism 103. This is the fundamental operation of the means for taking in the object image in the embodiment of FIG. 16. Constitutional elements in FIG. 16 that are identical with those of FIG. 2 are given like reference numerals, and their explanations are omitted.

The object image thus read out is Fourier-transformed and displayed as the joint Fourier-transformed image on the FLC-OASLM 107; and the joint Fourier-transformed image is then read out by the reading light radiated by the reading LD 108 and then Fourier-converted again to produce the correlation peak that represents the correlation coefficient between the input object and the reference object contained in the object image. This process is the same as in the first embodiment shown in FIG. 2.

Figure 17:
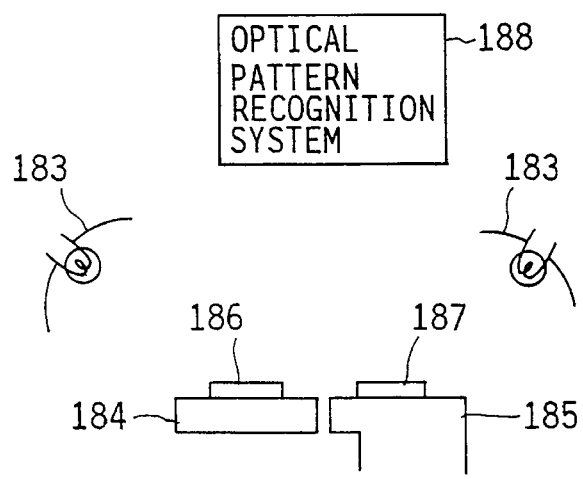
FIG. 17 is a schematic diagram showing one example method of taking in an object image in the example embodiment of FIG. 2.

FIG. 17 shows one example method of taking in the object image in the embodiment of FIG. 16. This represents a case where the optical pattern recognition system of the invention is applied to an automatic assembly equipment. In FIG. 17, denoted 183 is an illuminating optical system consisting of a light source and a light reflection/collection optical system; 184 a movable table such as a belt conveyor; 185 a stationary table; 186 an input object; 187 a reference object; and 188 an optical pattern recognition system. In automatic assembly equipment, the input objects 186 such as electronic and mechanical parts used for assembly are put on the movable table 184 such as belt conveyor for transport. The reference object 187 may be carried together with the input object 186 but generally it is often fixed on the stationary table 185.

Illuminating light emitted from the illuminating optical system 183 is reflected by the input object 186 and the reference object 187 and reaches the optical pattern recognition system 188 of this invention. The illuminating light that has reached the optical pattern recognition system 188 contains the images of the input object 186 and the reference object 187 and is taken into the system 188 according to the fundamental operation of the image input means. That is, the input object 186 and the reference object 187 work as the object 119 shown in FIG. 16. Since the illuminating light is also reflected from the surfaces of the movable table 184 and the stationary table 185, it is recommended that the color and brightness of the movable table 184 and the stationary table 187 be adjusted so that the input object 186 and the reference object 187 can be taken in in good contrast. For example, when the input object 186 and the reference object 187 have a white tone, the movable table 184 and the stationary table 185 preferably have the same color and brightness.

While the image input means shown in FIG. 17 represents a reflection illuminating system, it is also possible to make the movable table 184 and the stationary table 185 transparent tables and use a transmission projection illuminating system.

Figure 6B:
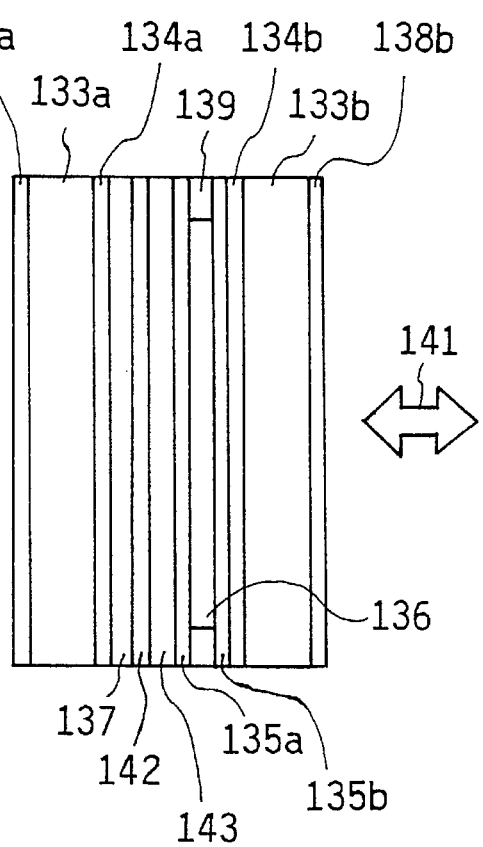

The second FLC-OASLM 117 of FIG. 16 can use either type of the FLC-OASLM, one without the light reflection layer shown in FIG. 6(a) or one with it shown in FIG. 6(b). Considering the requirements that the illuminating light not affect the correlation optical system and that the reflection factor of the reading light be increased, it is desirable to use the reflection type FLC-OASLM of FIG. 6(b) having the light reflection layer. When the digitized object image is taken into the optical pattern recognition system of this invention shown in FIG. 16, whether by using the FLC-OASLM with the light reflection layer or the one without it shown in FIG. 6, the method of driving the second FLC-OASLM 117 is similar to the FLC-OASLM driving method which was explained in the first embodiment.

FIG. 18 shows operation waveforms of the optical pattern recognition system of this invention in which an FLC-OASLM of FIG. 6(b) having a dielectric mirror as the light reflection layer is used as the second FLC-OASLM 117 of FIG. 16 and in which an FLC-OASLM of FIG. 6(a) having no dielectric mirror as the light reflection layer is used as the FLC-OASLM 107. The second FLC-OASLM 117, FLC-OASLM 107, writing LD 101, and reading LD 108 are synchronized by the drive control unit 112. FIG. 18(a) shows a drive waveform for the FLC-OASLM with a dielectric mirror and represents voltage changes in the photoconductive layer 137 when the transparent electrode 134b on the reading side of the FLC-OASLM of FIG. 6(b) with reflection layer is grounded. FIG. 18(b) shows a drive waveform for the FLC-OASLM without a dielectric mirror and represents voltage changes in the photoconductive layer 137 when the transparent electrode 134b on the reading side of the FLC-OASLM of FIG. 6(a) without reflection layer is grounded. FIG. 18(c) shows changes in current applied to the writing LD 101. FIG. 18(d) shows changes in current applied to the reading LD 108. FIG. 18(e) shows light response of the FLC-OASLM with dielectric mirror with respect to the drive voltage of FIG. 18(a) and represents changes in the reflected light intensity of the reading light radiated from the writing LD 101 and reflected by the FLC-OASLM. FIG. 18(f) shows light response of the FLC-OASLM without dielectric mirror with respect to the drive voltage of FIG. 18(b) and represents changes in the transmitted light intensity of the reading light radiated from the reading LD 108 and transmitted through the FLC-OASLM.

Pulse voltages are applied between the transparent electrodes 134a and 134b of the FLC-OASLMs with and without dielectric mirror in such a way that the voltage polarity of the photoconductive layers 137 of these FLC-OASLMs will change to a positive, a negative, and a zero voltage in that order repetitively as shown in FIG. 18(a) and 18(b). The positive voltage 144 that is applied to the FLC-OASLM with dielectric mirror is set sufficiently higher than the reversing threshold voltage in the dark state, and the negative voltage 145 is set higher than the reversing threshold voltage in the lighted state and lower than that in the dark state. The polarization direction of the reading light from the writing LD 101 for the FLC-OASLM with dielectric mirror and that of the reading light from the reading LD 108 for the FLC-OASLM without dielectric mirror are so set that the object image read out and the joint Fourier-transformed image will be positive images. These FLC-OASLMs erase images when the reading light is radiated at the same time that the positive voltage 144, 154 is applied, write images when the writing light is radiated at the same time that the negative voltage 145, 155 is applied, and read images when the reading light is radiated at the same time that the zero voltage 146, 156 is applied.

It is noted that the FLC-OASLM with dielectric mirror performs initialization or erases an image when applied with the positive voltage 144, whether it is radiated with the writing light for writing the object image or with the reading light from the writing LD 101. Next, when the negative voltage 145 is applied to write the object image, the object image written is kept in memory even when the drive voltage becomes zero voltage 146. The object image held in memory is read out by the reading light from the writing LD 101—which is applied with and oscillated by the current 147—and is converted into a coherent object image, which is then focused by the Fourier transform lens 106 onto the writing surface of the FLC-OASLM 107 as the joint Fourier-transformed image. The intensity of the joint Fourier-transformed image varies according to FIG. 18(e). That is, when the drive current 147 for the writing LD 101 is applied, the intensity of the reading light from the FLC-OASLM with dielectric mirror is at the high level 157. In other times, the reading light intensity is at the zero level 158.

The FLC-OASLM without dielectric mirror performs initialization or erases an image when applied with the positive voltage 154 while being radiated with the reading light from the reading LD 108—which is applied with and oscillated by the current 149a or 149. The current 149a is a drive current to generate the reading light for initialization. Comparison between FIG. 18(d) and 18(e) shows that when the joint Fourier-transformed image is being radiated onto the FLC-OASLM without dielectric mirror, the reading light is not emitted from the reading LD 108. The writing of the joint Fourier-transformed image onto the FLC-OASLM without dielectric mirror involves applying the drive current 147 to the writing LD 101 to emit the writing light for the joint Fourier-transformed image and at the same time applying the negative voltage 155 to the FLC-OASLM without dielectric mirror. The joint Fourier-transformed image thus written is kept recorded on the FLC-OASLM without dielectric mirror even during the zero voltage state 156 and is read out by the reading light which is emitted from the reading LD 108 in response to the drive current 149. In both the FLC-OASLMs with and without dielectric mirror, the recorded image is not erased during the zero voltage state even when the reading light intensity is increased to any magnitude. The joint Fourier-transformed image thus read out from the FLC-OASLM without dielectric mirror is Fourier-transformed again by the Fourier transform lens 106 into the correlation peak corresponding to the correlation coefficient between the input image and the reference image, both contained in the object image. The correlation peak intensity changes according to FIG. 18(f). It is noted that the low level 152 of the transmitted light intensity in FIG. 18(f) corresponds to the noise level when the joint Fourier-transformed image is not written onto the FLC-OASLM without dielectric mirror. With the above operation, the optical pattern recognition system of FIG. 16 according to this invention was found to be able to take in the object image with a revolution higher than 100 lp/mm and operate at speed less than 1 kHz.

Figure 19A:
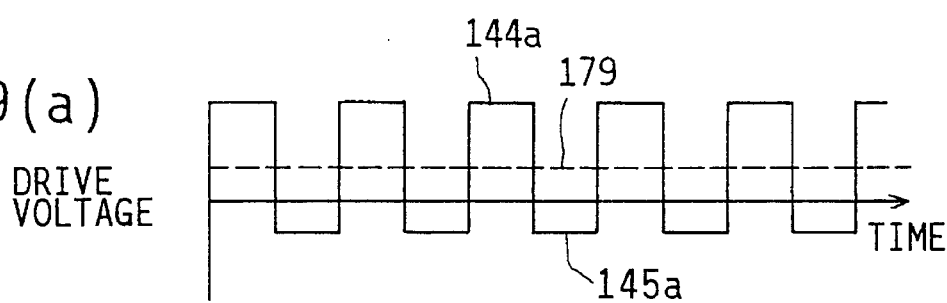
Figure 19B:
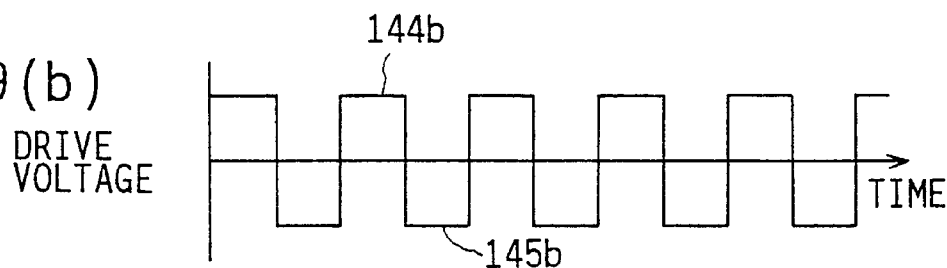
Figure 19C:
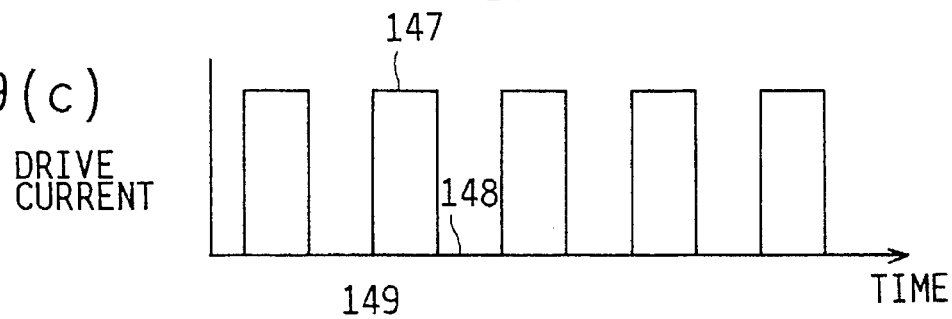
Figure 19D:
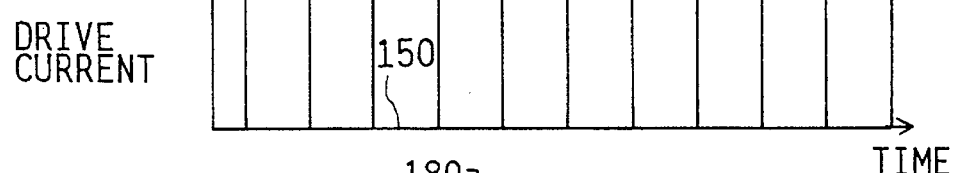

However, when comparing and identifying a person's face or landscape or very small amount of image information contained in an X-ray picture, the shade and tone of the object image have an important meaning. Now, the method of entering an object image having a continuously changing tone into the optical pattern recognition system of this invention shown in FIG. 16. FIG. 19 shows operation waveforms of constitutional elements in the optical pattern recognition system of the invention shown in FIG. 16. FIG. 19(a) represents a drive waveform for the FLC-OASLM with dielectric mirror, which is used as the second FLC-OASLM 117. FIG. 19(b) represents a drive waveform for the FLC-OASLM without dielectric mirror, which is used as the FLC-OASLM 107. FIG. 19(c) represents a drive waveform for the writing LD. FIG. 19(d) represents a drive waveform for the reading LD. FIG. 19 (e) represents light response of the FLC-OASLM with dielectric mirror. FIG. 19(f) represents light response of the FLC-OASLM without dielectric mirror. The drive waveform of FIG. 19(a) for the FLC-OASLM with dielectric mirror corresponds to the voltage changes in the photoconductive layer 137 when the transparent electrode 134b on the reading side of the FLC-OASLM with a light reflection layer shown in FIG. 6(b) is grounded. As is seen from the figure, the second FLC-OASLM 117 of FIG. 16 is operated by continually applying between the transparent electrodes 134a and 134b of the FLC-OASLM 117 a pulse voltage that causes the photoconductive layer 137 to change its voltage polarity to a positive and a negative alternately. A dc bias voltage 179 is superimposed on the pulse voltage across the transparent electrodes 134a and 134b to make the positive voltage 144a greater in magnitude than the negative voltage 145a. The dc bias voltage 179 has a magnitude such that the negative voltage 145a will not be higher than the reverse threshold voltage in the lighted state. The polarization direction of the reading light from the writing LD 101 is determined so that the object image read out will be a positive image. The second FLC-OASLM 117 erases an object image when applied with the positive voltage 144a and writes and reads the object image when applied with the negative voltage 145a. With such an asymmetric pulse voltage applied between the transparent electrodes 134a and 134b, during writing, the write voltage (negative voltage) proportional to the light intensity radiated onto the photoconductive layer 137 is applied to the ferroelectric liquid crystal layer 136 so that the ferroelectric liquid crystal molecules are acted upon by a reversing force proportional to the write voltage. At the same time, the ferroelectric liquid crystal molecules are also acted upon by a relaxing force generated by this asymmetry of the applied voltage, tending to cause them to return to the original stable state. Hence, the reading light intensity radiated onto the second FLC-OASLM 117 during writing, as obtained with this driving method, increases proportionally with the writing light intensity and attenuates over time. This attenuation time is determined by the relaxation time of the ferroelectric liquid crystal molecules and therefore the asymmetric pulse voltage preferably has the frequency higher than about 100 Hz. With the above-mentioned driving method, it is possible to write an object image having a continuously varying tone onto the second FLC-OASLM 117 in real time.

The drive waveform of FIG. 19(b) for the FLC-OASLM without dielectric mirror corresponds to voltage changes in the photoconductive layer 137 when the transparent electrode 134b on the reading side of the transmission type FLC-OASLM of FIG. 6(a) is grounded. The FLC-OASLM 107 of FIG. 16 is operated by continuously applying between the transparent electrodes 134a and 134b a pulse voltage that causes the photoconductive layer 137 of the FLC-OASLM 107 to change its voltage polarity to a positive and a negative alternately. It is noted that in this case the pulse voltage applied is a symmetric pulse voltage as opposed to the asymmetric pulse voltage employed in the reflection type FLC-OASLM. The pulse voltage is applied completely in the same phase and frequency as the asymmetric pulse voltage. The polarization direction of the reading light from the reading LD 108 is so determined that the object image read out will be a positive image. The FLC-OASLM 107 erases an object image when applied with the positive voltage 144b and writes and reads the object image when applied with the negative voltage 145b. With this operation, as explained in the first embodiment, the optically addressed type ferroelectric liquid crystal displays a digital image.

A drive current pulse of FIG. 19(c) is applied to the writing LD 101 to emit the writing light (or reading light) in synchronism with the pulse voltage applied to the FLC-OASLM 107 and the second FLC-OASLM 117. The phase of the drive current leads (or lags) that of the pulse voltage applied to the FLC-OASLM 107 and the second FLC-OASLM 117 by π/4.

A drive current pulse of FIG. 19(d) is applied to the reading LD 108 to emit the reading light in synchronism with the pulse voltage applied to the FLC-OASLM 107. This drive current leads (or lags) the drive current applied to the writing LD 101 by π/2. The pulse voltages and pulse currents of FIG. 19(a) to 19(d) are synchronized by the drive control circuit 112 powered by the power supply 113.

The initialization of the second FLC-OASLM 117 and the erasing of the object image are carried out when the positive voltage 144a is applied, regardless of the intensities of the writing light and the reading light radiated onto the second optically addressed type liquid crystal light valve. This is made possible by the asymmetric pulse voltage. The initialization of the FLC-OASLM 107 and the erasing of the joint Fourier-transformed image are performed when the FLC-OASLM 107 is applied with the positive voltage 144b and with the reading light simultaneously.

Figure 19E:
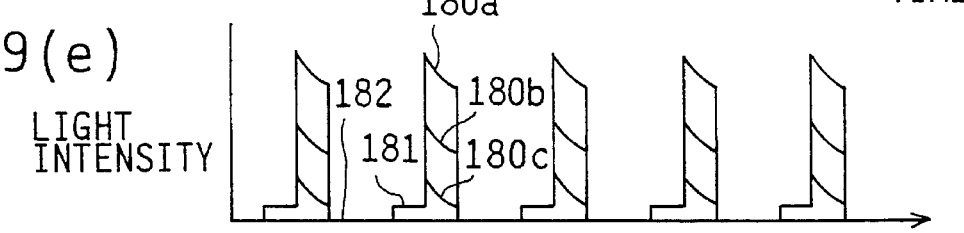
Figure 19F:
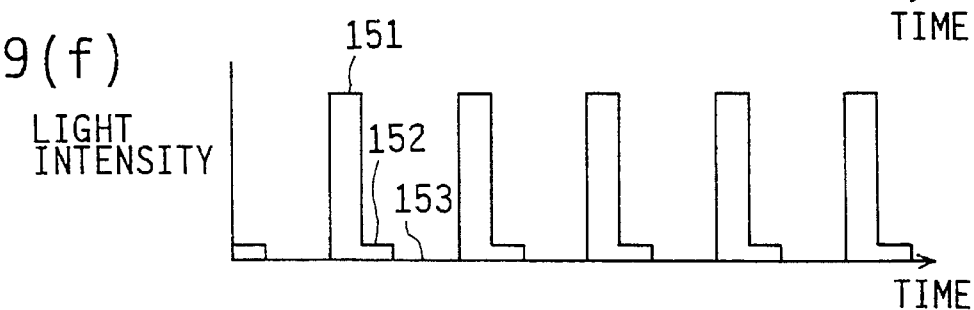

The light response, shown in FIG. 19(e), of the FLC-OASLM with dielectric mirror represents changes over time of the reflected light intensity of the reading light emitted from the writing LD 101 in the second FLC-OASLM 117. The pulses 180a, 180b, 180c represent reflected light intensities when the writing light intensity of each object image decreases successively. As is seen from this figure, when the writing LD 101 is being oscillated, application of the positive voltage 144a to the second FLC-OASLM 117 causes the reflected light intensity to decrease to a weak level 181. Application of the negative voltage 145a to the second FLC-OASLM 117 produces a reflected light intensity corresponding to the light intensity of the object image writing light. When, on the other hand, the writing LD 101 is not being oscillated, the second FLC-OASLM 117 is not radiated with the reading light, so that the reflected light intensity becomes zero level 182. This means that an object image with a continuously changing tone can be written onto and read from the second FLC-OASL 117.

The light response, shown in FIG. 19(f), of the FLC-OASLM without dielectric mirror represents changes over time of the transmitted light intensity of the reading light emitted from the reading LD 108 in the FLC-OASLM 107 of FIG. 16. The object image from the second FLC-OASLM 117 of FIG. 16 with dielectric mirror is read out by the reading light emitted from the writing LD 101 and is digitally recorded as the joint Fourier-transformed image on the FLC-OASLM 107 when it is applied with the negative voltage 145b, as explained in the first embodiment. As long as the FLC-OASLM 107 is applied with the negative voltage 145b, the digitally recorded joint Fourier-transformed image is kept in memory even when the writing LD 101 stops oscillating. Hence, if at this time the reading LD 108 is oscillated, the digitally recorded joint Fourier-transformed image is read out from the FLC-OASLM 107 as the maximum transmitted light intensity shown at 151 in FIG. 19(f). The initialization of the FLC-OASLM 107 and the erasing of the image on it are done by applying the positive voltage 144b to the FLC-OASLM while at the same time emitting the reading light from the reading LD 108. Therefore, if the positive voltage 144b is applied to the FLC-OASLM 107 without dielectric mirror, the reading light produced when the reading LD 108 is oscillated does not pass through the FLC-OASLM 107, causing the transmitted light intensity to become weak as shown at 152 in FIG. 19(f). When the reading LD 108 is not being oscillated, the reading light that passes through the FLC-OASLM 107 having no dielectric mirror becomes zero, as shown at 153 in FIG. 19(f).

It has been found that the configuration of the embodiment shown in FIG. 16 and the associated driving method explained above enable the optical pattern recognition system of this invention to be operated at high speed of 100 Hz or higher, without using a special electrically addressed type spatial light modulator used in the embodiment of FIG. 2. Arranging the constitutional elements of the embodiment in a way shown in FIG. 16 can further reduce the optical pattern recognition system of the invention shown in FIG. 2 to about one-half in its total length, making it more compact. It is easily seen that this arrangement of the constitutional elements can also be applied to the system that employs the electrically addressed type spatial light modulator as the image input means.

The optical pattern recognition apparatus of this invention has as a fundamental algorithm a joint transform correlator whose joint Fourier transform image is binarized. Hence, when the number of reference images that must be recognized at one time is small, the pattern recognition can be performed with a very good S/N ratio. But as the number of reference images that must be checked at one time increases, noise sharply increases, lowering the S/N ratio or causing erroneous recognition. To avoid this problem the system is provided with two means. The first means determines two-dimensional correlation coefficients between a plurality of reference images and an input image from a plurality of correlation peak intensities that are produced by the joint transform correlator and which correspond to the correlation coefficients between the input image and the reference images. The second means changes the transmission factor or reflection factor for the corresponding portion of each reference image in a linear or nonlinear relationship with the correlation coefficients by a masking spatial light modulator arranged before or after the reference image. With these two means incorporated, the small optical pattern recognition system of this invention may, for example, be formed with a feedback loop to enable correct pattern recognition even when a large number of reference images are used.

As mentioned above, the optical pattern recognition system of this invention automatically identifies and measures a specified pattern by performing an optical correlation processing, which uses coherent light, on a two-dimensional image directly obtained from an object or through a CCD camera. The optical pattern recognition system of this invention is a joint transform correlator which comprises: means for transforming into a coherent image at least one reference image including specified marks and at least one input image to be entered, both images being displayed on image display means; means for performing an optical Fourier transform on the coherent image to produce a joint Fourier-transformed image of the reference image and the input image; means for converting the joint Fourier-transformed image into an intensity distribution image and displaying the intensity distribution image on an optically addressed type spatial light modulator; means for reading the intensity distribution image displayed on the optically addressed type spatial light modulator by using coherent light; means for Fourier-transforming the intensity distribution image thus read out to produce a two-dimensional correlation image distribution between the reference image and the input image; and a light-electricity conversion element for detecting a correlation peak intensity corresponding to the correlation coefficient between the reference image and the input image, both included in the correlation image distribution. In such a joint transform correlator, the means for transforming into a coherent image at least one reference image including specified marks and at least one input image to be entered, both images being displayed on an image display means, includes a laser diode whose oscillation wavelength is less than 900 nm. The means for reading the intensity distribution image displayed on the optically addressed type spatial light modulator by using coherent light includes a laser diode whose oscillation wavelength is more than 660 nm. The optically addressed type spatial light modulator is an FLC-OASLM without a light reflection layer whose photoconductive layer is formed of a hydrogenated amorphous silicon. The means for performing an optical Fourier transform on the coherent image to produce a joint Fourier-transformed image of the reference image and the input image and the means for Fourier-transforming the intensity distribution image read out from the optically addressed type spatial light modulator to produce a two-dimensional correlation image distribution between the reference image and the input image are formed by one and the same Fourier transform lens. This configuration enables the joint transform light correlator of this invention to be formed compact, about 1/10 to 1/2 the size of or 1/20 to 1/4 the length of the conventional joint transform light correlator. This configuration also permits operation at 30 Hz, which is a video rate, or high-speed operation typically at 100 Hz or higher. This offers an advantage of being able to increase the operation speed, within a practical equipment size, of the pattern recognition sensor used in automatic assembly equipment and of an image identification device for X-ray picture.

The optical pattern recognition system of this invention essentially calculates correlations between images in parallel and thus can be used as an optical computing apparatus for high-speed parallel processing of two-dimensional information such as images. The invention provides a significant advantage because these computing apparatuses can be formed in a compact and practical size.

The high-speed driving method for the FLC-OASLM according to this invention allows the use of strong reading light, so strong as to affect the photoconductive layer, without affecting the writing characteristic, regardless of whether the spatial light modulator has a light reflection separation layer such as dielectric mirror and light shielding layer. The driving method of the invention also permits a high-speed driving at 100 Hz or higher. With this method, it is possible to connect a plurality of ferroelectric liquid crystal spatial light modulators in series or in loop and operate them in synchronism with each other to realize a complicated system which is capable of performing advanced processing.

Since this system employs not only the laser diode that can directly modulate the light source but an FLC shutter as well, it is possible to easily modulate the intensity of the writing light and the reading light emitted from an arbitrary light source, thus improving the flexibility in configuring the system.

We claim:

1. An optical pattern recognition system which automatically recognizes or measures a specified pattern from two-dimensional images, the optical pattern recognition system comprising: image display means for displaying at least one reference image including at least one target and at least one input image to be entered; first means, including a laser diode having an oscillation wavelength less than 900 nm, for converting the at least one reference image and the at least one input image into a coherent image; second means having a Fourier transform lens for performing an optical Fourier transform on the coherent image to produce a joint Fourier-transformed image of the reference image and the input image; an optically addressed type ferroelectric liquid crystal spatial light modulator having no light reflection layer; third means for converting the joint Fourier-transformed image into an intensity distribution image and displaying the intensity distribution image on the optically addressed type ferroelectric liquid crystal spatial light modulator; fourth means, including a laser diode having an oscillation wavelength longer than 660 nm, for reading the intensity distribution image displayed on the optically addressed type ferroelectric liquid crystal spatial light modulator by using the coherent light; fifth means having a Fourier transform lens for Fourier-transforming the intensity distribution image read out to produce a two-dimensional correlation image distribution of the reference image and the input image, the second and the fifth means sharing the same Fourier transform lens; and a light-electricity conversion element for detecting the correlation peak intensity of the reference image and the input image contained in the correlation image distribution.

2. An optical pattern recognition system as claimed in claim 1; wherein the optically addressed type ferroelectric liquid crystal spatial light modulator has a photoconductive layer comprised of hydrogenated amorphous silicon.

3. An optical pattern recognition system as claimed in claim 2; wherein the image display means comprises an optically addressed type ferroelectric liquid crystal spatial light modulator having a light reflection layer.

4. An optical pattern recognition system as claimed in claim 3; further comprising a drive control circuit which performs the following controls:

controlling the image display means, the optically addressed type ferroelectric liquid crystal spatial light modulator having no light reflection layer, the laser diode having the oscillation frequency of less than 900 nm and the laser diode having the oscillation frequency of more than 660 nm;

controlling the time during which a specified image is displayed on the image display means, the time during which the laser diode having the oscillation frequency of less than 900 nm is energized, and the time during which the write voltage is applied to the optically addressed type ferroelectric liquid crystal spatial light modulator without the light reflection layer in such a way that these time durations overlap for at least a specified period of time;

controlling the time during which the erase voltage is applied to the optically addressed type ferroelectric liquid crystal spatial light modulator without the light reflection layer and the time during which the laser diode having the oscillation wavelength of more than 660 nm is energized in such a way that these time durations overlap for at least a specified period of time; and controlling the laser diode having the oscillation wavelength of less than 900 nm and the laser diode having the oscillation wavelength of more than 660 nm in such a way that these two diodes will not be energized at the same time.

5. An optical pattern recognition system as claimed in claim 2; wherein the image display means comprises an electrically addressed type ferroelectric liquid crystal spatial light modulator.

6. An optical pattern recognition system as claimed in claim 5; further comprising a drive control circuit which performs the following controls:

controlling the image display means, the optically addressed type ferroelectric liquid crystal spatial light modulator having no light reflection layer, the laser diode having the oscillation frequency of less than 900 nm and the laser diode having the oscillation frequency of more than 660 nm;

controlling the time during which a specified image is displayed on the image display means, the time during which the laser diode having the oscillation frequency of less than 900 nm is energized, and the time during which the write voltage is applied to the optically addressed type ferroelectric liquid crystal spatial light modulator without the light reflection layer in such a way that these time durations overlap for at least a specified period of time;

controlling the time during which the erase voltage is applied to the optically addressed type ferroelectric liquid crystal spatial light modulator without the light reflection layer and the time during which the laser diode having the oscillation wavelength of more than 660 nm is energized in such a way that these time durations overlap for at least a specified period of time; and controlling the laser diode having the oscillation wavelength of less than 900 nm and the laser diode having the oscillation wavelength of more than 660 nm in such a way that these two diodes will not be energized at the same time.

7. An optical pattern recognition system as claimed in claim 2; further comprising a drive control circuit which performs the following controls:

controlling the image display means, the optically addressed type ferroelectric liquid crystal spatial light modulator having no light reflection layer, the laser diode having the oscillation frequency of less than 900 nm and the laser diode having the oscillation frequency of more than 660 nm;

controlling the time during which a specified image is displayed on the image display means, the time during which the laser diode having the oscillation frequency of less than 900 nm is energized, and the time during which the write voltage is applied to the optically addressed type ferroelectric liquid crystal spatial light modulator without the light reflection layer in such a way that these time durations overlap for at least a specified period of time;

controlling the time during which the erase voltage is applied to the optically addressed type ferroelectric liquid crystal spatial light modulator without the light reflection layer and the time during which the laser diode having the oscillation wavelength of more than 660 nm is energized in such a way that these time durations overlap for at least a specified period of time; and controlling the laser diode having the oscillation wavelength of less than 900 nm and the laser diode having the oscillation wavelength of more than 660 nm in such a way that these two diodes will not be energized at the same time.

8. An optical pattern recognition system as claimed in claim 1; wherein the image display means comprises an optically addressed type ferroelectric liquid crystal spatial light modulator having a light reflection layer.

9. An optical pattern recognition system as claimed in claim 8; further comprising a drive control circuit which performs the following controls:

controlling the image display means, the optically addressed type ferroelectric liquid crystal spatial light modulator having no light reflection layer, the laser diode having the oscillation frequency of less than 900 nm and the laser diode having the oscillation frequency of more than 660 nm;

controlling the time during which a specified image is displayed on the image display means, the time during which the laser diode having the oscillation frequency of less than 900 nm is energized, and the time during which the write voltage is applied to the optically addressed type ferroelectric liquid crystal spatial light modulator without the light reflection layer in such a way that these time durations overlap for at least a specified period of time;

controlling the time during which the erase voltage is applied to the optically addressed type ferroelectric liquid crystal spatial light modulator without the light reflection layer and the time during which the laser diode having the oscillation wavelength of more than 660 nm is energized in such a way that these time durations overlap for at least a specified period of time; and controlling the laser diode having the oscillation wavelength of less than 900 nm and the laser diode having the oscillation wavelength of more than 660 nm in such a way that these two diodes will not be energized at the same time.

10. An optical pattern recognition system as claimed in claim 1; wherein the image display means comprises an electrically addressed type ferroelectric liquid crystal spatial light modulator.

11. An optical pattern recognition system as claimed in claim 10; further comprising a drive control circuit which performs the following controls:

controlling the image display means, the optically addressed type ferroelectric liquid crystal spatial light modulator having no light reflection layer, the laser diode having the oscillation frequency of less than 900 nm and the laser diode having the oscillation frequency of more than 660 nm;

controlling the time during which a specified image is displayed on the image display means, the time during which the laser diode having the oscillation frequency of less than 900 nm is energized, and the time during which the write voltage is applied to the optically addressed type ferroelectric liquid crystal spatial light modulator without the light reflection layer in such a way that these time durations overlap for at least a specified period of time;

controlling the time during which the erase voltage is applied to the optically addressed type ferroelectric liquid crystal spatial light modulator without the light reflection layer and the time during which the laser diode having the oscillation wavelength of more than 660 nm is energized in such a way that these time durations overlap for at least a specified period of time; and controlling the laser diode having the oscillation wavelength of less than 900 nm and the laser diode having the oscillation wavelength of more than 660 nm in such a way that these two diodes will not be energized at the same time.

12. An optical pattern recognition system as claimed in claim 1, further comprising a drive control circuit which performs the following controls:

controlling the image display means, the optically addressed type ferroelectric liquid crystal spatial light modulator having no light reflection layer, the laser diode having the oscillation frequency of less than 900 nm and the laser diode having the oscillation frequency of more than 660 nm;

controlling the time during which a specified image is displayed on the image display means, the time during which the laser diode having the oscillation frequency of less than 900 nm is energized, and the time during which the write voltage is applied to the optically addressed type ferroelectric liquid crystal spatial light modulator without the light reflection layer in such a way that these time durations overlap for at least a specified period of time;

controlling the time during which the erase voltage is applied to the optically addressed type ferroelectric liquid crystal spatial light modulator without the light reflection layer and the time during which the laser diode having the oscillation wavelength of more than 660 nm is energized in such a way that these time durations overlap for at least a specified period of time; and controlling the laser diode having the oscillation wavelength of less than 900 nm and the laser diode having the oscillation wavelength of more than 660 nm in such a way that these two diodes will not be energized at the same time.

* * * * *